(12) United States Patent
Komatsu

(10) Patent No.: US 7,483,712 B2
(45) Date of Patent: Jan. 27, 2009

(54) TRANSMISSION POWER CONTROL METHOD, BASE STATION, MOBILE STATION, AND MOBILE COMMUNICATION SYSTEM

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 443 days.

(21) Appl. No.: 11/248,269

(22) Filed: Oct. 13, 2005

(65) Prior Publication Data
US 2006/0040697 A1 Feb. 23, 2006

Related U.S. Application Data

(62) Division of application No. 10/066,767, filed on Feb. 6, 2002, now Pat. No. 7,010,320.

(30) Foreign Application Priority Data
Feb. 16, 2001 (JP) ............................. 2001-040510

(51) Int. Cl.
*H04B 7/00* (2006.01)
(52) U.S. Cl. ...................... 455/522; 455/67.16; 455/69; 455/67.11
(58) Field of Classification Search ................ 455/522, 455/69, 67.1, 226.1, 515, 238, 446, 456, 455/63.1, 562.1; 370/342, 335–341, 465
See application file for complete search history.

(56) References Cited

U.S. PATENT DOCUMENTS 5,491,837 A * 2/1996 Haartsen ...................... 455/62
6,108,535 A 8/2000 Moriya et al.
6,119,010 A * 9/2000 Labedz ........................ 455/446
6,295,289 B1 * 9/2001 Ionescu et al. ............... 370/342
6,490,460 B1 12/2002 Soliman
6,675,000 B1 1/2004 Ichikawa
6,735,256 B1 5/2004 Toshimitsu
6,760,596 B1 7/2004 Fiorini et al.
6,801,760 B2 10/2004 Hutchison et al.
6,862,457 B1 3/2005 Sarkar et al.

(Continued)

FOREIGN PATENT DOCUMENTS

JP 5-199167 A 8/1993

(Continued)

*Primary Examiner*—Tan Trinh
(74) *Attorney, Agent, or Firm*—Sughrue Mion, PLLC

(57) ABSTRACT

This invention is to prevent deterioration in communication quality of closed loop transmission power control, which may occur when the change in transmission power cannot keep up with a sudden change in the state of a transmission path. Transmission power control command extractor 4 extracts a transmission power control command from the uplink signal that has been received by receiver 2. Mobile position predictor 7 predicts the future position of the mobile station from its present position as recognized by mobile position recognizer 5 and from its present rate of movement as recognized by mobile velocity recognizer 6. Database 8 records the state of the downlink transmission path as a function of mobile position. Transmission power controller 9 looks up database 8 on the basis of the predicted future position of the mobile station and controls the downlink transmission power of base station BS on the basis of (i) the result of this lookup, and (ii) the transmission power control command. Transmitter 11 transmits at the downlink transmission power that has been instructed by transmission power controller 9.

15 Claims, 9 Drawing Sheets

U.S. PATENT DOCUMENTS

| | | | | |
|---|---|---|---|---|
| 7,035,661 B1 * | 4/2006 | Yun | ............................ | 455/522 |
| 2002/0115461 A1 * | 8/2002 | Shiraki et al. | ................ | 455/522 |
| 2003/0222819 A1 * | 12/2003 | Karr et al. | .................... | 342/457 |

FOREIGN PATENT DOCUMENTS

| | | |
|---|---|---|
| JP | 7-231473 A | 8/1995 |
| JP | 8-256103 A | 10/1996 |
| JP | 9-121193 A | 5/1997 |
| JP | 2000-22611 A | 1/2000 |
| JP | 2000-138633 A | 5/2000 |
| JP | 2000-165320 A | 6/2000 |
| JP | 2000-197118 A | 7/2000 |
| JP | 3109311 B2 | 9/2000 |
| JP | 2000-312179 A | 11/2000 |
| JP | 2002-515712 A | 5/2002 |
| WO | 00/33478 A1 | 6/2000 |

* cited by examiner

TRANSMISSION POWER CONTROL METHOD, BASE STATION, MOBILE STATION, AND MOBILE COMMUNICATION SYSTEM

This is a divisional of application Ser. No. 10/066,767 filed Feb. 6, 2002 now U.S. Pat. No. 7,010,320. The entire disclosure of the prior application, application Ser. No. 10/066,767 is hereby incorporated by reference.

BACKGROUND OF THE INVENTION

1. Field of the Invention

This invention relates to a radio base station capable of detecting the position of a terminal device (a mobile station) during communication. It also relates to said terminal device, and to the transmission power control method employed by said terminal and base station.

2. Description of Related Art

It is well known that in a cellular mobile communication system employing code division multiple access (CDMA), all the users transmit information simultaneously using the same frequency band. As a result, the users' signals mutually interfere. A radio signal received by a base station from the terminal (a mobile station) of a user located near the base station is much stronger than a radio signal received from another user terminal located in the vicinity of the radio cell boundary. To express this differently, a signal transmitted from a user terminal that is far from a base station undergoes greater attenuation than a signal transmitted from a nearby user terminal. This phenomenon is called the "near-far effect" or the "near-far problem". Consequently, a user terminal that is far from a base station is screened by a user terminal in the vicinity of the base station. In order to maintain sufficient capacity, all signals must arrive at the base station with the same average power irrespective of the distance from the user to the base station. One solution to this problem is transmission power control that keeps the average received power at the base station constant.

Hence in a CDMA based cellular mobile communication system, high-precision transmission power control is necessary for stable operation of the system as a whole, and in particular for maintaining subscriber capacity.

The physical channels used in a CDMA system can be classified into a perch channel, a common physical channel and a dedicated physical channel. The perch channel is a unidirectional channel from a base station to a mobile station, and is initially seized by the mobile station when its power is turned on. The common physical channel is shared by the plurality of mobile stations that are present within one and the same cell. For example, in the downlink direction from a base station to a mobile station, the common physical channel carries the paging channel for paging mobile stations. This paging channel is transmitted from a plurality of base stations simultaneously and, in order to reduce mobile station power consumption while the mobile station is waiting, has a sleep mode function that uses grouping. After the cell in which a specific mobile station is located has been identified, a variety of control signals are exchanged through control channels provided as an uplink/downlink pair. The dedicated physical channel is used to exchange user data between a base station and a specific mobile station, and to exchange a variety of control information during a call, and this channel has a variable rate function.

CDMA systems generally apply a combination of open loop control and closed loop control to facilitate high-precision transmission power control under conditions of rapid movement. Transmission power control can be divided into uplink (or reverse link) transmission power control and downlink (or forward link) transmission power control. The main purpose of uplink transmission power control is to overcome the near-far problem mentioned above. As opposed to this, the aim of downlink transmission power control is to decrease interference.

A description will first of all be given of uplink transmission power control.

Transmission power control by a mobile station is implemented by an open loop based on measurement of the received power in the perch channel. In other words, a mobile station recognizes the base station transmission power as reported over the perch channel, compares this with the measured received power in the same channel, and thereby estimates the propagation loss. The mobile station also uses the received power of interfering signals at the base station, this having been reported over the perch channel, to determine the transmission power in the common physical channel, which it does in accordance with a prescribed formula. In other words, in open loop control, a mobile station determines its transmission power on the basis of the average received power.

To provide more precise control, in addition to the aforementioned open loop control, closed loop transmission power control is applied in the dedicated physical channel over which user data is transmitted. This closed loop control is based on measurement of the signal-to-interference ratio (SIR), which is the ratio of the power of the desired wave to that of the interfering wave. The SIR is also called the carrier/interference (C/I) ratio.

A base station makes a slot-by-slot comparison of the measured SIR and the target SIR. On the basis of the result of this comparison, the base station uses a transmission power control (TPC) bit inserted in the data signal to command the mobile station to increase or decrease its transmission power. This TPC bit serves to instruct the mobile station to increase or decrease its transmission power, and is also referred to as a control instruction or a transmission power control command. In this sequence of operations, the most reliable way of evaluating transmission quality is in terms of bit error rate (BER) or frame error rate (FER), and hence outer loop control is provided in addition to inner loop control based on SIR. The outer loop control changes the target SIR dynamically in accordance with the results of measurement of BER or FER, these results reflecting the diversity effect achieved by transmitting from a variety of sectors within the base station.

The mobile station determines $P_{DPCH}$, the transmission power in the dedicated physical channel, by adding $P_{closed-loop}$, the content of the TPC bit sent from the base station, to $P_{open-loop}$, the result previously obtained by the open loop control. In other words, $P_{DPCH} = P_{open-loop} + P_{closed-loop}$.

A description will next be given of downlink transmission power control.

Two methods of downlink transmission power control are known. The first involves controlling base station transmission power on the basis of the position (distance) of a mobile station, and is sometimes called "distance-driven transmission power control". The second, like the closed loop control described above in connection with uplink transmission power control, involves controlling base station transmission power on the basis of SIR or C/I. This second method is sometimes called "C/I-driven transmission power control".

First of all, distance-driven transmission power control will be described. If the position (distance) of a mobile station is known, the combined transmission power of the base stations can be minimized by a base station transmitting to a mobile station at the cell boundary at a high transmission power and transmitting to a mobile station in the vicinity of the base station at a low transmission power. Distance-driven transmission power control is particularly suitable for non-shadowing environments, where "shadowing" signifies the slow signal fluctuation that often occurs in outdoor radio environments due to the signal being screened by hills, buildings, etc. This is because attenuation of power is determined only by distance. A pilot signal has to be transmitted from the base station so that mobile stations can measure their distance from the base station.

Next, C/I-driven transmission power control will be described. This method is intended to reduce the C/I ratio (SIR) of each user (i.e. of each mobile station) on an individual basis. Each mobile station has to transmit information relating to its C/I ratio (i.e., a control instruction) to the base station. On the basis of this information, the base station is able to decide whether its transmission power to a specific mobile station should be increased or decreased. In other words, high channel capacity is achieved by performing transmission power control so that the SIR attains a prescribed value. This will now be described in greater detail. A mobile station measures the downlink reception quality and compares this measured reception quality with a control target value. If the measured reception quality is higher than the target, the mobile station transmits to the base station a control instruction causing it to reduce its transmission power. Conversely, if the measured reception quality is lower than the control target, the mobile station transmits to the base station a control instruction causing it to increase its transmission power. The base station increases or decreases its transmission power in accordance with these control instructions.

A conventional transmission power control method will now be described with reference to FIG. 7, which is a block diagram showing the configuration of a conventional mobile communication system. The illustrated transmission power control method corresponds to the aforementioned downlink C/I-driven transmission power control, and the depicted mobile communication system comprises base station BS and mobile station MS. In the example of FIG. 7, the left-hand side is the base station and the right-hand side is the mobile station.

Base station BS comprises receiving antenna 1 for receiving the uplink radio signal transmitted via the uplink from mobile station MS, receiver 2 connected to this antenna 1, received uplink data output terminal 3 connected to receiver 2, downlink transmission power control command extractor 4 connected to receiver 2, downlink transmission power controller 9 connected to this downlink transmission power control command extractor 4, downlink data input terminal 10 to which downlink data is supplied, transmitter 11 connected to this downlink data input terminal 10 and to downlink transmission power controller 9, and, connected to this transmitter 11, transmitting antenna 12 for transmitting the downlink radio signal via the downlink to mobile station MS.

Mobile station MS comprises receiving antenna 13 for receiving the downlink radio signal transmitted via the downlink from base station BS, receiver 14 connected to this receiving antenna 13, demodulator 15 connected to this receiver 14, received downlink demodulated data output terminal 16 connected to demodulator 15, downlink transmission path state estimator 17 connected to receiver 14, downlink transmission power control command generator 18 connected to this downlink transmission path state estimator 17, uplink data input terminal 19 to which uplink data is supplied, mixer 20 connected to this uplink data input terminal 19 and to downlink transmission power control command generator 18, transmitter 21 connected to this mixer 20, and, connected to this transmitter 21, transmitting antenna 22 for transmitting the uplink radio signal via the uplink to base station BS.

In base station BS, when transmitter 11 receives downlink data from downlink data input terminal 10, it spreads this downlink data and transmits the spread signal from transmitting antenna 12 as a downlink radio signal.

In mobile station MS, receiving antenna 13 receives the downlink radio signal transmitted from transmitting antenna 12 of base station BS and sends it to receiver 14. Receiver 14 despreads this received downlink signal and outputs the despread signal to demodulator 15. Demodulator 15 demodulates the despread signal and outputs the demodulated downlink data from downlink demodulated data output terminal 16.

Independently of this, the downlink signal from receiver 14 is supplied to downlink transmission path state estimator 17. Downlink transmission path state estimator 17 estimates the state of the downlink transmission path from the received signal obtained from receiver 14. By way of example, downlink transmission path state estimator 17 makes this estimation by calculating the signal-to-interference+noise ratio (SINR: the ratio of the received power of the desired wave (S) to the sum of the received power of the interfering wave (I) and the noise power (N)). It is of course also feasible to use the aforementioned SIR instead of the SINR. Downlink transmission path state estimator 17 sends, to downlink transmission power control command generator 18, an estimated transmission path signal indicative of the estimated state of the downlink transmission path. On the basis of the estimated state of the downlink transmission path indicated by this estimated transmission path signal, downlink transmission power control command generator 18 generates a downlink transmission power control command for either increasing or decreasing the downlink transmission power of base station BS. This will now be described in greater detail. Downlink transmission power control command generator 18 compares, by way of example, the calculated SINR and the target SINR, and if the calculated SINR is smaller than the target SINR, it generates a downlink transmission power control command instructing base station BS to increase its downlink transmission power. On the other hand, if the calculated SINR is larger than the target SINR, downlink transmission power control command generator 18 generates a downlink transmission power control command instructing base station BS to decrease its downlink transmission power.

The downlink transmission power control command generated by downlink transmission power control command generator 18 is supplied to mixer 20. Mixer 20 mixes this downlink transmission power control command with the uplink data supplied from uplink data input terminal 19 and sends the mixed uplink data to transmitter 21. Transmitter 21 spreads the mixed uplink data and transmits the spread signal from transmitting antenna 22 as the uplink radio signal.

In base station BS, receiving antenna 1 receives the uplink radio signal and feeds it to receiver 2. Receiver 2 despreads and demodulates the received uplink signal. The uplink data thereby obtained is output from received uplink data output terminal 3. In order to extract the downlink transmission power control command from the received uplink signal, the uplink signal (information) is sent from receiver 2 to downlink transmission power control command extractor 4. The downlink transmission power control command extracted by downlink transmission power control command extractor 4 is sent to downlink transmission power controller 9. In response to the downlink transmission power control command, downlink transmission power controller 9 determines the next transmission power by instructing transmitter 11 to increase or decrease its downlink transmission power by a fixed amount. Transmitter 11 then transmits at a downlink transmission power that conforms to the instruction from downlink transmission power controller 9.

The reception quality at mobile station MS is thus kept constant by controlling the downlink transmission power of base station BS in such manner that, from the point of view of mobile station MS, the state of the downlink transmission path remains constant.

Although the example shown in FIG. 7 was used to describe downlink transmission power control, the same configuration could also be made to perform uplink transmission power control by taking the right-hand side of FIG. 7 as the base station and the left-hand side as the mobile station.

FIG. 8 is a block diagram showing a conventional mobile communication system which implements a conventional uplink transmission power control method. In this example, base station BS comprises, instead of downlink transmission power control command extractor 4 and downlink transmission power controller 9, uplink receiving state estimator 23, uplink transmission power control command generator 25 and mixer 26. Mobile station MS comprises, instead of downlink transmission path state estimator 17, downlink transmission power control command generator 18 and mixer 20, uplink transmission power control command extractor 27 and uplink transmission power controller 28.

In base station BS, receiving antenna 1 receives the uplink radio signal and supplies it to receiver 2. Receiver 2 despreads and demodulates this uplink signal. The uplink data thereby obtained is output from received uplink data output terminal 3.

Independently of this, the uplink signal from receiver 2 is supplied to uplink receiving state estimator 23. Uplink receiving state estimator 23 uses the signal from receiver 2 to estimate the uplink receiving state. This uplink receiving state can be estimated from the uplink signal level, or from the SIR of the demodulated data, or from the BER of the demodulated data, or from the FER of the demodulated data, or from the estimated state of the transmission path, etc. Uplink receiving state estimator 23 sends, to uplink transmission power control command generator 25, an estimated receiving state signal indicative of the estimated receiving state. On the basis of the estimated uplink receiving state indicated by this estimated receiving state signal, uplink transmission power control command generator 25 generates an uplink transmission power control command for either increasing or decreasing the uplink transmission power of mobile station MS. This will now be described in greater detail. Uplink transmission power control command generator 25 compares, by way of example, the estimated uplink receiving state with a reference value, and if the estimated uplink receiving state is smaller than the reference value, it generates an uplink transmission power control command instructing mobile station MS to increase its uplink transmission power. On the other hand, if the estimated uplink receiving state is greater than the reference value, uplink transmission power control command generator 25 generates an uplink transmission power control command instructing mobile station MS to decrease its uplink transmission power.

The uplink transmission power control command generated by uplink transmission power control command generator 25 is supplied to mixer 26. Mixer 26 mixes this uplink transmission power control command with the downlink data supplied from downlink data input terminal 10, and sends the mixed downlink data to transmitter 11. Transmitter 11 spreads the mixed downlink data and transmits the spread signal from transmitting antenna 12 as the downlink radio signal.

In mobile station MS, receiving antenna 13 receives the downlink radio signal transmitted from transmitting antenna 12 of base station BS and sends it to receiver 14. Receiver 14 despreads this downlink received signal and sends the despread signal to demodulator 15. Demodulator 15 demodulates the despread signal and outputs the demodulated downlink data from received downlink demodulated data output terminal 16. In order to extract the uplink transmission power control command from the received downlink signal, the downlink signal (information) is sent from receiver 14 to uplink transmission power control command extractor 27. The uplink transmission power control command extracted by this uplink transmission power control command extractor 27 is sent to uplink transmission power controller 28. In response to the uplink transmission power control command, uplink transmission power controller 28 determines the next uplink transmission power by instructing transmitter 21 to increase or decrease its uplink transmission power by a fixed amount. Transmitter 21 then transmits at an uplink transmission power that conforms to the instruction from uplink transmission power controller 28.

The average receiving power at base station BS is thus kept constant by controlling the uplink transmission power of mobile station MS in such manner that the receiving state at base station BS remains constant.

A variety of prior art techniques relating to such a C/I-driven transmission power control method have been proposed. For example, JP 2000-022611 A (hereinafter called the "first prior art reference") discloses a "transmission power control method and radio communication apparatus" for a system successively changing directivity in accordance with the position of a distant party and the propagation environment, which controls both the transmission directivity gain and the transmission power to increase communication quality. This first prior art reference adopts a configuration whereby the transmission directivity gain is calculated on the basis of reception weights calculated by an adaptive array antenna; transmission weights are controlled on the basis of this calculated transmission directivity gain; and the gain of the transmission power amplifier is controlled in accordance with transmission power control information contained in the received signal.

JP 2000-138633 A (hereinafter called the "second prior art reference") discloses a "transmission power control method, transmission power control apparatus, mobile station, base station and control station" which, in propagation environments such as multipath and/or when the rate of movement of a mobile station changes, rapidly alters the control target of the transmission power control, thereby keeping channel quality constant and providing the desired channel quality. In this second prior art reference, each time a frame is received from a distant station, if a frame error is detected, the control target (e.g., the signal-to-interference power ratio) is increased by $SIR_{inc}$, and otherwise the control target is decreased by $SIR_{doc}$, where $SIR_{doc}$ is the product of the target FER and $SIR_{inc}$.

JP 2000-165320 A hereinafter called the "third prior art reference") discloses a "transmission power control apparatus and transmission power control method" adapted to increase transmission power only when necessary for position detection. In this third prior art reference, if position detection has been performed correctly, a control signal closes a control switch and transmission power control is carried out by the transmission power control circuit on the basis of the received power of the signal obtained by combining direct and delayed waves. On the other hand, if position detection has not been performed correctly, a control signal opens the switch and transmission power control is carried out on the basis of the received power of the direct wave only.

A variety of prior art techniques relating to distance-driven transmission power control have also been proposed. For example, JP 2000-197118 A (hereinafter called the "fourth prior art reference") discloses a "radio communication apparatus and method for setting specifications of a radio communication apparatus" capable of automatically setting the frequency band, transmission power, etc. in accordance with the specification of the radio waves used in the service region. In this forth prior art reference, a position information detector uses an antenna to receive a radio wave from a GPS satellite and inputs this radio wave to a GPS receiver. The GPS receiver despreads and demodulates the spread-spectrum signal transmitted from the GPS satellite and sends the demodulated signal to a positioning unit. The positioning unit extracts, from the demodulated signal, information relating to the position when the radio communication apparatus is used, and outputs it to the specification controller CPU. This CPU accesses the memory on the basis of the position information sent from the positioning unit, reads from the memory the radio wave specification corresponding to service region, controls the oscillation frequency of the oscillator, and controls power by controlling the amplifier gain.

JP H08-256103 A (hereinafter called the "fifth prior art reference") discloses a "radio communication system" which, in a radio communication system comprising a base station and a plurality of mobile stations, is very economical and can very easily control the transmission power of the mobile stations in accordance with the relative distance between them and the base station, without causing the frequency utilization efficiency to decrease. This fifth prior art reference also discloses a "radio communication system" which can very easily control the transmission power of the mobile stations in similar manner even if the base station is a semi-fixed station capable of movement. In this fifth prior art reference, each mobile station can comprise: means for utilizing GPS or other position data to detect its own position; means for calculating the relative distance between itself and the base station from its own detected position and from preset information relating to the position of the base station; and control means for controlling its own transmission power in accordance with the calculated relative distance. Further, according to this fifth prior art reference, if the base station is a semi-fixed station capable of moving, then the base station, too, is provided with means for detecting its own position and is adapted to transmit information relating to its own detected position to the mobile stations.

JP H09-121193 A (hereinafter called the "sixth prior art reference") relates to a "radio communication system, base station and mobile station" for communicating by radio signals, and discloses technical ideas that enable signals to be transmitted at an efficient transmission power regardless of changes in communication time and received electric field. In the context of a radio communication system wherein mobile stations communicate by radio via a base station, this sixth prior art reference is configured so that a mobile station detects its own position and transmits information relating to this position to the base station. The base station holds information relating to base station transmission powers corresponding to mobile positions within the base station's radio area, and determines its own transmission power by referring to the base station transmission power information corresponding to the position information sent from the mobile station. The base station then controls its transmission power on the basis of the transmission power value that is found in this way.

Prior art that combines distance-driven transmission power control and C/I-driven transmission power control has also been proposed. For example, Japanese Patent No. 3109311 (hereinafter called the "seventh prior art reference") discloses a mobile station radio transceiver, a base station radio transceiver and a mobile communication system which, in a mobile communication system that adopts spread spectrum communication, are capable of controlling the transmission power from a mobile station more accurately than previous systems, without calls being dropped unexpectedly. The base station radio transceiver disclosed in this seventh prior art reference calculates the distance between the base station and the mobile station on the basis of information relating to the latitude and longitude of the mobile station and information relating to the latitude and longitude of the base station. The base station transceiver then performs control wherein a communication protocol is relaxed in accordance with this calculated distance and the quality of the received signal. For example, when a mobile station is located within the service area of the base station, the base station transceiver relaxes the communication protocol, adopted by previous systems, that causes the communication to be terminated. This makes it possible to prevent a call from being dropped when the receiving level temporarily decreases. The mobile station radio transceiver disclosed in this seventh prior art reference controls transmission power on the basis of (i) information relating to the distance to the base station and (ii) the quality of the received signal. This prevents the use of excessive power when transmitting to the base station, which can occur when for example a mobile station has been screened by something, the output amplifier gain has increased due to the receiving level decreasing, and then the mobile station has come out from behind whatever was screening it. The mobile station radio transceiver disclosed in this seventh prior art reference also notifies the user, again, on the basis of (i) information relating to the distance to the base station and (ii) the quality of the received signal, of deterioration in the received signal when the distance to the base station is within a prescribed range and the signal has deteriorated. This lets the user know that the call has not been dropped.

The problems described below are encountered with conventional transmission power control methods of the sort disclosed in the prior art illustrated in FIG. 7 and FIG. 8, and in the seven prior art references outlined above.

The first problem is that changes in transmission power do not keep up with sudden changes in the state of the transmission path (i.e., in the receiving state).

A specific example of this will be described with reference to FIGS. 9a and 9b, based on the mobile communication system shown in FIG. 7. FIG. 9a shows the transmission power of base station BS and FIG. 9b shows the receiving level at mobile station MS, with mobile position plotted along the horizontal axis. FIGS. 9a and 9b illustrate a case where the state of the transmission path suddenly changes from good to bad as a result of the position of mobile station MS. When the state of the transmission path suddenly deteriorates, the receiving level at mobile station MS drops as shown in FIG. 9b, which means that communication quality deteriorates. This can result in a call being dropped.

This shortcoming of conventional transmission power control methods is due to the fact that, whether a C/I-driven or a distance-driven transmission power control method is employed, control is performed on the basis of the present (or past) state of the transmission path (i.e., on the basis of the present or past receiving state). In other words, in a conventional C/I-driven transmission power control method, the present transmission path state (receiving state) is estimated from the calculated present SIR or SINR, and transmission power is controlled on the basis of this estimated present (or past) transmission path state (receiving state). In conventional distance-driven transmission power control methods, the present transmission path state (receiving state) is estimated from the present position of the mobile station, and transmission power is controlled on the basis of this estimated present (or past) transmission path state (receiving state). As a result, it becomes difficult for changes in transmission power to keep up with sudden changes in transmission path state (receiving state).

A second problem is that if the transmission path state (the receiving state) has become so poor that the prescribed communication quality is not obtained even when transmitting at maximum power, the very high transmission power constitutes significant interference to other users.

SUMMARY OF THE INVENTION

In the light of the aforementioned problems, it is an object of the present invention to provide a transmission power control method capable of transmission power control that is always optimal, even if the transmission path state (receiving state) changes suddenly.

As described above, in conventional transmission power control methods the changes in transmission power have difficulty in keeping up with sudden changes in transmission path state (receiving state), and this is due to the fact that these conventional methods control transmission power on the basis of the estimated present (or past) transmission path state (receiving state). The present inventor therefore wondered if it would be possible to solve the aforementioned problems of the prior art by means of some method that was capable of predicting the future state of the transmission path (the future receiving state). In other words, by controlling transmission power on the basis of this predicted future transmission path state (receiving state), transmission power could be changed in advance, before a sudden change in transmission path state (receiving state). Moreover, by controlling the transmission power in such manner that it is not excessively increased when it is predicted that transmission path state (receiving state) will become very poor, the aforementioned interference to other users can be prevented from arising.

The present invention provides a method for controlling the transmission power of a first station in a communication system wherein a radio signal is transmitted from this first station to a second station via a fluctuating transmission path: which is characterized by predicting the future state of this transmission path and controlling the transmission power of the first station in accordance with this predicted future transmission path state.

The present invention also provides a method for controlling the transmission power of radio signals in a communication system wherein these radio signals are transmitted and received between a first station and a second station via a fluctuating transmission path: which is characterized by predicting the future state of this transmission path and controlling the transmission power of the radio signals in accordance with this predicted future transmission path state.

The present invention also provides a method for controlling the downlink transmission power of a base station in a mobile communication system wherein downlink radio signals are transmitted from this base station to a mobile station via a downlink: which is characterized by predicting the future state of this downlink transmission path and controlling the downlink transmission power of the base station in accordance with this predicted future transmission path state.

The present invention also provides a method for controlling the uplink transmission power of a mobile station in a mobile communication system wherein uplink radio signals are transmitted from this mobile station to a base station via an uplink: which is characterized by predicting the future state of this uplink transmission path and controlling the uplink transmission power of the mobile station in accordance with this predicted future transmission path state.

The present invention also provides a method for controlling the transmission power of radio signals in a mobile communication system wherein these radio signals are transmitted and received between a mobile station and a base station via a link: which is characterized by predicting the future state of the transmission path of this link and controlling the transmission power of the radio signals in accordance with this predicted future transmission path state.

The present invention also provides a method for controlling the downlink transmission power of a base station in a mobile communication system wherein downlink radio signals are transmitted from this base station to a mobile station via a downlink: which is characterized by predicting the future position of the mobile station, obtaining the future state of the downlink transmission path corresponding to this predicted future position of the mobile station, and controlling the downlink transmission power of the base station on the basis of this future state of the downlink transmission path that has been obtained.

The present invention also provides a method for controlling the uplink transmission power of a mobile station in a mobile communication system wherein uplink radio signals are transmitted from this mobile station to a base station via an uplink: which is characterized by predicting the future position of the mobile station, obtaining the future state of the uplink transmission path corresponding to this predicted future position of the mobile station, and controlling the uplink transmission power of the mobile station on the basis of the future state of the uplink transmission path that has been obtained.

The present invention also provides of a method for controlling the transmission power of radio signals in a mobile communication system wherein these radio signals are transmitted and received between a mobile station and a base station via a link: which is characterized by predicting the future position of the mobile station, obtaining the future state of the transmission path of this link corresponding to this predicted future position of the mobile station, and controlling the transmission power of the radio signals on the basis of this future transmission path state of the link that has been obtained.

The present invention also provides a method for controlling the downlink transmission power of a base station in a mobile communication system wherein downlink radio signals are transmitted from this base station to a mobile station via a downlink: which is characterized by recognizing the present position of the mobile station, recognizing the present rate of movement of the mobile station, predicting the future position of the mobile station from its present position and present rate of movement, obtaining the future state of the downlink transmission path corresponding to this predicted future position of the mobile station, and controls the downlink transmission power of the base station on the basis of this future state of the downlink transmission path that has been obtained.

The present invention also provides a method for controlling the uplink transmission power of a mobile station in a mobile communication system wherein uplink radio signals are transmitted from this mobile station to a base station via an uplink: which is characterized by recognizing the present position of the mobile station, recognizes the present rate of movement of the mobile station, predicting the future position of the mobile station from its present position and present rate of movement, obtaining the future state of the uplink transmission path corresponding to this predicted future position of the mobile station, and controlling the uplink transmission power of the mobile station on the basis of this future state of the uplink transmission path that has been obtained.

The present invention also provides a method for controlling the transmission power of radio signals in a mobile communication system wherein these radio signals are transmitted and received between a mobile station and a base station via a link: which is characterized by recognizing the present position of the mobile station, recognizing the present rate of movement of the mobile station, predicting the future position of the mobile station from its present position and present rate of movement, obtaining the future state of the transmission path of the link corresponding to this predicted future position of the mobile station, and controlling the transmission power of the radio signals on the basis of this future transmission path state of the link that has been obtained.

The present invention provides a base station which controls its downlink transmission power in a mobile communication system wherein downlink radio signals are transmitted from this base station to a mobile station via a downlink: which is characterized by comprising means for predicting the future state of the downlink transmission path, and means for controlling the transmission power of the downlink radio signals in accordance with this predicted future transmission path state.

The present invention also provides a mobile station which controls its uplink transmission power in a mobile communication system wherein uplink radio signals are transmitted from this mobile station to a base station via an uplink: which is characterized by comprising means for predicting the future state of the uplink transmission path, and means for controlling the transmission power of the uplink radio signals in accordance with this predicted future transmission path state.

The present invention also provides a mobile communication system for transmitting and receiving radio signals between a mobile station and a base station via a link: which is characterized by comprising means for predicting the future state of the transmission path of this link, and means for controlling the transmission power of these radio signals in accordance with this predicted future transmission path state.

The present invention also provides a base station which controls its downlink transmission power in a mobile communication system wherein downlink radio signals are transmitted from this base station to a mobile station via a downlink: which is characterized by comprising means for predicting the future position of the mobile station, means for obtaining the future state of the downlink transmission path corresponding to this predicted future position of the mobile station, and means for controlling the downlink transmission power of the base station on the basis of this future state of the downlink transmission path that has been obtained.

The present invention also provides a mobile station which controls its uplink transmission power in a mobile communication system wherein uplink radio signals are transmitted from this mobile station to a base station via an uplink: which is characterized by comprising means for predicting the future position of the mobile station, means for obtaining the future state of the uplink transmission path corresponding to this predicted future position of the mobile station, and means for controlling the transmission power of the uplink radio signals on the basis of this future state of the uplink transmission path that has been obtained.

The present invention also provides a mobile communication system for transmitting and receiving radio signals between a mobile station and a base station via a link: which is characterized by comprising means for predicting the future position of the mobile station, means for obtaining the future state of the transmission path of this link corresponding to this predicted future position of the mobile station, and means for controlling the transmission power of the radio signals on the basis of this future transmission path state of the link that has been obtained.

The present invention also provides a base station which controls its downlink transmission power in a mobile communication system wherein downlink radio signals are transmitted from this base station to a mobile station via a downlink: which is characterized by comprising means for recognizing the present position of the mobile station, means for recognizing the present rate of movement of the mobile station, means for predicting the future position of the mobile station from its present position and present rate of movement, means for obtaining the future state of the downlink transmission path corresponding to this predicted future position of the mobile station, and means for controlling the downlink transmission power of the base station on the basis of the future state of the downlink transmission path that has been obtained.

The present invention also provides a mobile station which controls its uplink transmission power in a mobile communication system wherein uplink radio signals are transmitted from this mobile station to a base station via an uplink: which is characterized by comprising means for recognizing its present position, means for recognizing its present rate of movement, means for predicting its future position from its present position and present rate of movement, means for obtaining the future state of the uplink transmission path corresponding to this predicted future position of the mobile station, and means for controlling its uplink transmission power on the basis of this future uplink transmission path state that has been obtained.

The present invention also provides a mobile communication system in which radio signals are transmitted and received between a mobile station and a base station via a link: which is characterized by comprising means for recognizing the present position of the mobile station, means for recognizing the present rate of movement of the mobile station, means for predicting the future position of the mobile station from its present position and present rate of movement, means for obtaining the future state of the transmission path of the link corresponding to this predicted future position of the mobile station, and means for controlling the transmission power of the radio signals on the basis of this future transmission path state of the link that has been obtained.

The present invention provides a base station which uses downlink transmission power control commands transmitted from a mobile station via an uplink to control its downlink transmission power in such manner that the downlink receiving state at this mobile station becomes good: a base station comprising a receiver for receiving uplink radio signals that have been transmitted via the uplink; a downlink transmission power control command extractor for extracting the aforementioned downlink transmission power control commands from the received uplink signal; a mobile position recognizer for recognizing the present position of the mobile station from the received uplink signal; a mobile velocity recognizer for recognizing the present rate of movement of the mobile station from the received uplink signal; a mobile position predictor for predicting the future position of the mobile station from its present position and present rate of movement; a database in which the state of the downlink transmission path has been recorded as a function of mobile position; a downlink transmission power controller for looking up the database on the basis of the predicted future position of the mobile station, and for controlling the downlink transmission power of the base station on the basis of (i) the future state of the downlink transmission path obtained as a result of the lookup, and (ii) the aforementioned downlink transmission power control command; and a transmitter for transmitting at the downlink transmission power instructed by the downlink transmission power controller.

The database in the base station preferably records the state of the downlink transmission path as a function of the position of the mobile station, where the state of the downlink transmission path has been evaluated from the time series of downlink transmission power control commands that have been received. The state of the downlink transmission path can be communicated from the mobile station to the base station, and the database in the base station can be adapted to record this communicated state of the downlink transmission path as a function of the position of the mobile station. Preferably, when it is predicted that the state of the downlink transmission path will deteriorate, the downlink transmission power controller in the base station increases the downlink transmission power in advance within a range that does not exceed the maximum transmission power. Preferably, when it is predicted that the state of the downlink transmission path will become very poor, the downlink transmission power controller in the base station does not increase the downlink transmission power. The database in the base station can also control transmission power during diversity handover by sharing information with a plurality of base stations.

The present invention provides a base station which uses uplink transmission power control commands transmitted from the base station via a downlink to control the uplink transmission power of a mobile station in such manner that the uplink receiving state at this base station becomes good: which is characterized by comprising a receiver for receiving uplink radio signals that have been transmitted via the uplink; an uplink receiving state estimator for estimating the receiving state of the uplink from the received uplink signal; a mobile position recognizer for recognizing the present position of the mobile station from the received uplink signal; a mobile velocity recognizer for recognizing the present rate of movement of the mobile station from the received uplink signal; a mobile position predictor for predicting the future position of the mobile station from its present position and present rate of movement; a database in which the state of the uplink transmission path has been recorded as a function of mobile position; an uplink transmission power control command generator for looking up the database on the basis of the predicted future position of the mobile station, and for generating an uplink transmission power control command for controlling the uplink transmission power of the mobile station on the basis of (i) the future state of the uplink transmission path obtained as a result of the lookup, and (ii) the aforementioned estimated uplink receiving state; a mixer for outputting the mixed signal obtained by mixing the downlink data with the aforementioned generated uplink transmission power control command; and a transmitter for transmitting the mixed signal.

The database in the base station preferably records the state of the uplink transmission path as a function of the position of the mobile station, where the state of the uplink transmission path is evaluated from the level of the received uplink signal. It is also feasible for the database in the base station to record the state of the uplink transmission path as a function of the position of the mobile station, where the state of the uplink transmission path is evaluated from the SIR of the data after the received uplink signal has been demodulated. It is also feasible for the database in the base station to record the state of the uplink transmission path as a function of the position of the mobile station, where the state of the uplink transmission path is evaluated from the BER of the data after the received uplink signal has been demodulated. It is also feasible for the database in the base station to record the state of the uplink transmission path as a function of the position of the mobile station, where the state of the uplink transmission path is evaluated from the FER of the data after the received uplink signal has been demodulated. It is also feasible for the database in the base station to record the state of the uplink transmission path as a function of the position of the mobile station, where the state of the uplink transmission path is evaluated from the estimated state of the transmission path. When it is predicted that the state of the uplink transmission path will deteriorate, the uplink transmission power control command generator in the base station preferably generates an uplink transmission power control command that increases the uplink transmission power in advance. When it is predicted that the state of the uplink transmission path will become very poor, the uplink transmission power control command generator in the base station preferably generates an uplink transmission power control command that does not increase the uplink transmission power. It is also feasible for the database in the base station to control transmission power during diversity handover by sharing information with a plurality of base stations.

The present invention provides a mobile station which uses uplink transmission power control commands transmitted from a base station via a downlink to control its uplink transmission power in such manner that the uplink receiving state at the base station becomes good: which is characterized by comprising a receiver for receiving downlink radio signals that have been transmitted via the downlink; an uplink transmission power control command extractor for extracting the aforementioned uplink transmission power control commands from the received downlink signal; a mobile position recognizer for recognizing the present position of the mobile station; a mobile velocity recognizer for recognizing the present rate of movement of the mobile station; a mobile position predictor for predicting the future position of the mobile station from its present position and present rate of movement; a database in which the state of the uplink transmission path has been recorded as a function of mobile position; an uplink transmission power controller for looking up the database on the basis of the predicted future position of the mobile station, and for controlling the uplink transmission power of the mobile station on the basis of (i) the future state of the uplink transmission path obtained as a result of the lookup, and (ii) the aforementioned uplink transmission power control commands; and a transmitter for transmitting at the uplink transmission power instructed by the uplink transmission power controller.

Preferably, when it is predicted that the state of the uplink transmission path will deteriorate, the uplink transmission power controller in the mobile station increases the uplink transmission power in advance within a range that does not exceed the maximum transmission power. Preferably, when it is predicted that the state of the uplink transmission path will become very poor, the uplink transmission power controller in the mobile station does not increase the uplink transmission power.

The present invention provides a mobile station which uses downlink transmission power control commands transmitted from the mobile station via the uplink to control the downlink transmission power of a base station so that the downlink receiving state at the mobile station becomes good: which is characterized by comprising a receiver for receiving downlink radio signals that have been transmitted via the downlink; a downlink transmission path state estimator for estimating the present state of the downlink transmission path from the received downlink signal; a mobile position recognizer for recognizing the present position of the mobile station; a mobile velocity recognizer for recognizing the present rate of movement of the mobile station; a mobile position predictor for predicting the future position of the mobile station from its present position and present rate of movement; a database in which the state of the downlink transmission path has been recorded as a function of mobile position; a downlink transmission power control command generator for looking up the database on the basis of the predicted future position of the mobile station, and for generating downlink transmission power control commands for controlling the downlink transmission power of the base station on the basis of (i) the future state of the downlink transmission path obtained as a result of the lookup, and (ii) the aforementioned estimated present state of the transmission path; a mixer for outputting the mixed signal obtained by mixing the uplink data with the aforementioned generated downlink transmission power control command; and a transmitter for transmitting the mixed signal.

Preferably, when it is predicted that the state of the downlink transmission path will deteriorate, the downlink transmission power control command generator in the mobile station generates a downlink transmission power control command that increases the downlink transmission power in advance. Preferably, when it is predicted that the state of the downlink transmission path will become very poor, the downlink transmission power control command generator in the mobile station generates a downlink transmission power control command that does not increase the downlink transmission power.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
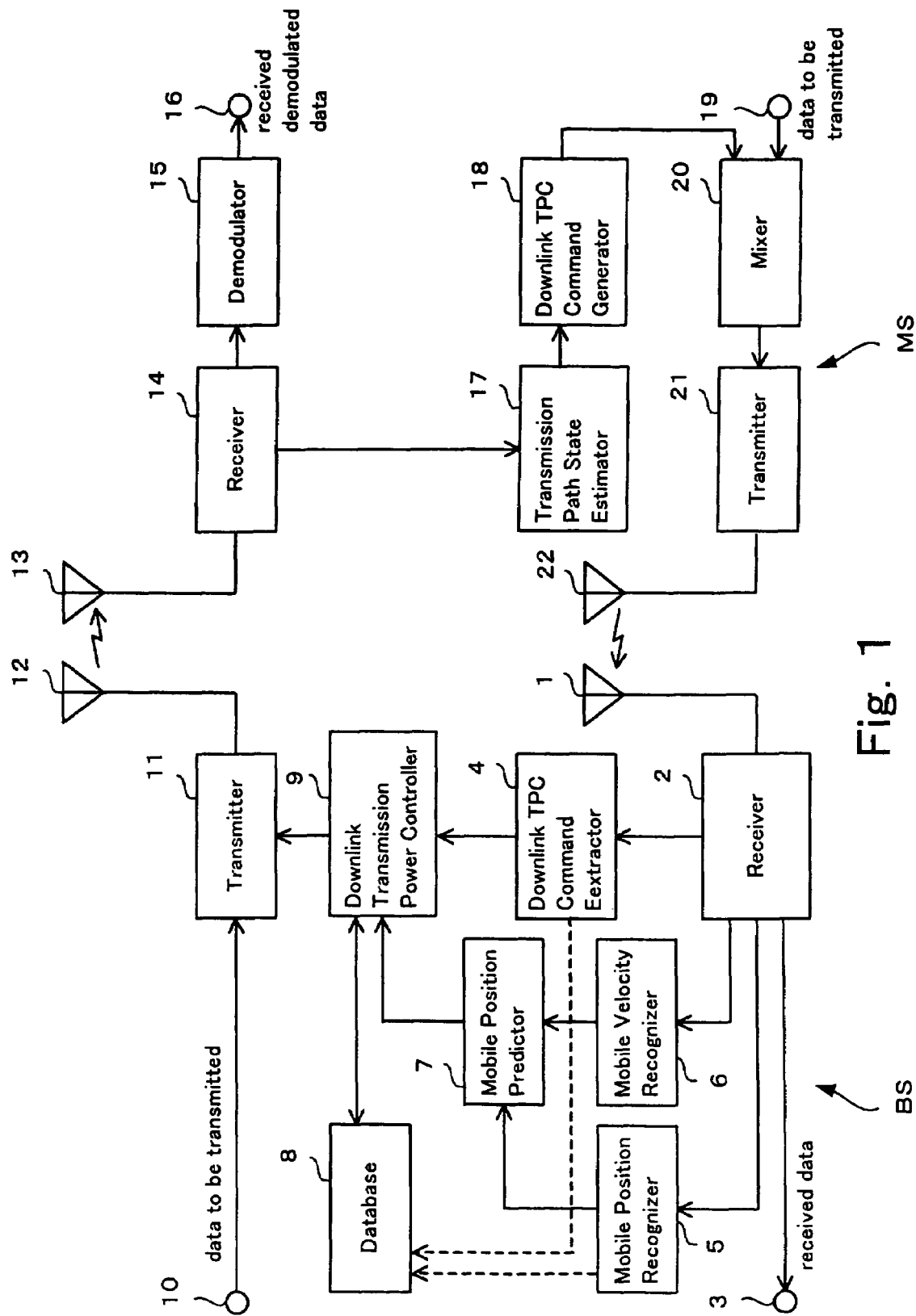
FIG. 1 is a block diagram showing a mobile communication system to which is applied a transmission power control method according to a first embodiment of this invention.

Referring to FIG. 1, a description will be given of a mobile communication system to which is applied a transmission power control method according to a first embodiment of the invention. It may be pointed out that the transmission power control method of this first embodiment pertains to a downlink transmission power control method. The mobile communication system comprises base station BS and mobile station MS, and in this first embodiment, as in FIG. 7, the left-hand side is base station BS and the right-hand side is mobile station MS.

The mobile communication system illustrated in FIG. 1 has the same configuration as the system shown in FIG. 7, except that the configuration of base station BS has been altered, in the manner to be described below, from the configuration shown in FIG. 7. Accordingly, parts having the same function as parts illustrated in FIG. 7 are given the same referencing numerals, and in order to simplify the description, only those points that differ from the system previously outlined with reference to FIG. 7 will be described below.

Figure 7:
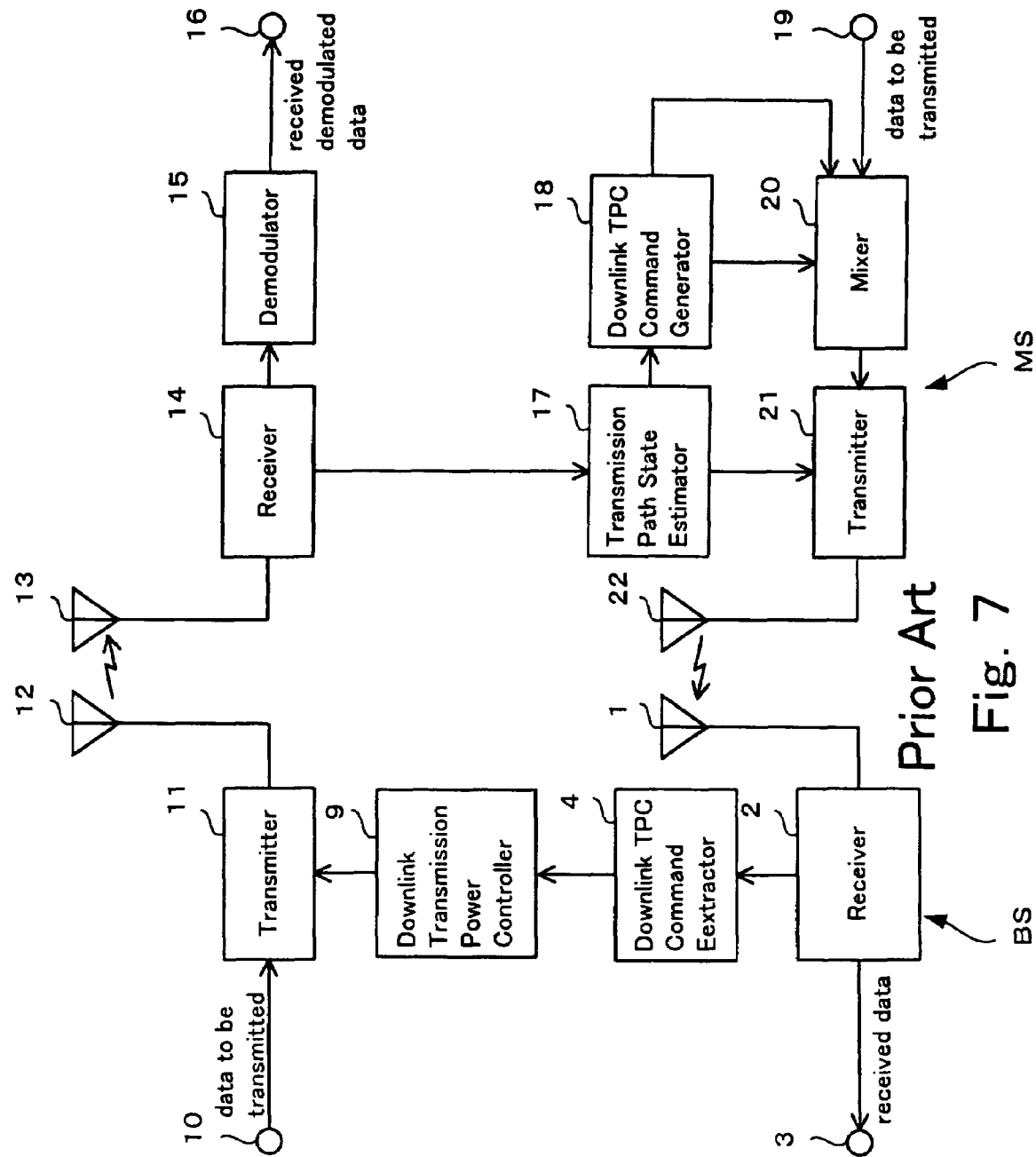
FIG. 7 is a block diagram showing a mobile communication system to which is applied a first conventional transmission power control method.

The mobile communication system illustrated in FIG. 1 differs from the system shown in FIG. 7 in that base station BS additionally comprises: mobile position recognizer 5 and mobile velocity recognizer 6 to which are input the received uplink signal from receiver 2; mobile position predictor 7 for predicting the future position of the mobile station from its present position as recognized by mobile position recognizer 5 and its present velocity as recognized by mobile velocity recognizer 6; and database 8 in which the state of the downlink transmission path has been recorded as a function of mobile position. Mobile position predictor 7 communicates the predicted future position of mobile station MS to downlink transmission power controller 9, and downlink transmission power controller 9 is adapted to be able to access database 8.

A description will now be given of the operation of base station BS illustrated in FIG. 1.

In base station BS, receiving antenna 1 receives uplink radio signals and feeds them to receiver 2. Receiver 2 despreads and demodulates the received uplink signal. The received uplink data thereby obtained is output from received uplink data output terminal 3. In order to extract the downlink transmission power control command from the received uplink signal, the uplink signal (information) is sent from receiver 2 to downlink transmission power control command extractor 4. The downlink transmission power control command extracted by downlink transmission power control command extractor 4 is sent to downlink transmission power controller 9. The operation up to this point is the same as the previously described operation of conventional base station BS illustrated in FIG. 7.

Mobile position recognizer 5 recognizes the present position of mobile station MS from the received uplink signal from receiver 2. Mobile velocity recognizer 6 recognizes changes in the position of mobile station MS (in other words, it recognizes the present rate of movement of mobile station MS) from the received uplink signal from receiver 2.

The present position of mobile station MS can for example be detected by calculation from (i) the direction in which the received uplink signal arrives, and (ii) distance D (the propagation distance between base station BS and mobile station MS). The direction in which the received uplink signal arrives can be detected by utilizing the characteristics of an array antenna. Distance can be found, by way of example, in the following way. Firstly, the sum $T_{sum}$ ($=2T_{pro}+T_{re-tr}$) of:

$T_{pro}$, the propagation delay of the downlink radio signal from base station BS to mobile station MS $T_{re-tr}$, the receive/transmit processing time, measured from when mobile station MS begins to receive the downlink radio signal to when it finishes transmitting the uplink radio signal $T_{pro}$, the propagation delay of the uplink radio signal from mobile station MS to base station BS is found. Because $T_{re-tr}$, the receive/transmit processing time, is known, the round trip propagation time $2T_{pro}$ ($=T_{sum}-T_{re-tr}$) can be found by subtracting the receive/transmit processing time $T_{re-tr}$ from the aforementioned sum $T_{sum}$. Propagation distance D ($=T_{pro} \times c$) is obtained by multiplying the one-way propagation time $T_{pro}$ by the velocity (c) at which the radio wave propagates. In order to increase the precision with which the present position of mobile station MS is measured, it is feasible for example to make corrections based on topographical maps and/or to combine position information from a plurality of base stations. It is also feasible for mobile station MS to detect its own present position and/or present velocity using a plurality of base stations or by means of an external signal from for example the global positioning system (GPS). In this case, mobile station MS communicates to base station BS position information indicative of this detected present position, and velocity information indicative of the detected present velocity.

In the following description, T represents the transmission power control interval. Mobile position predictor 7 predicts the future position of mobile station MS at elapsed times T, 2T, . . . , nT from the present moment, from previous positions and velocities of mobile station MS.

Downlink transmission power controller 9 acquires, from database 8, the future state of the downlink transmission path at the predicted future position of mobile station MS at elapsed times T, 2T, . . . , nT from the present. If there are no changes in these predicted future states of the downlink transmission path, downlink transmission power controller 9 changes the downlink transmission power in accordance with the received downlink transmission power control command.

Figure 2A:
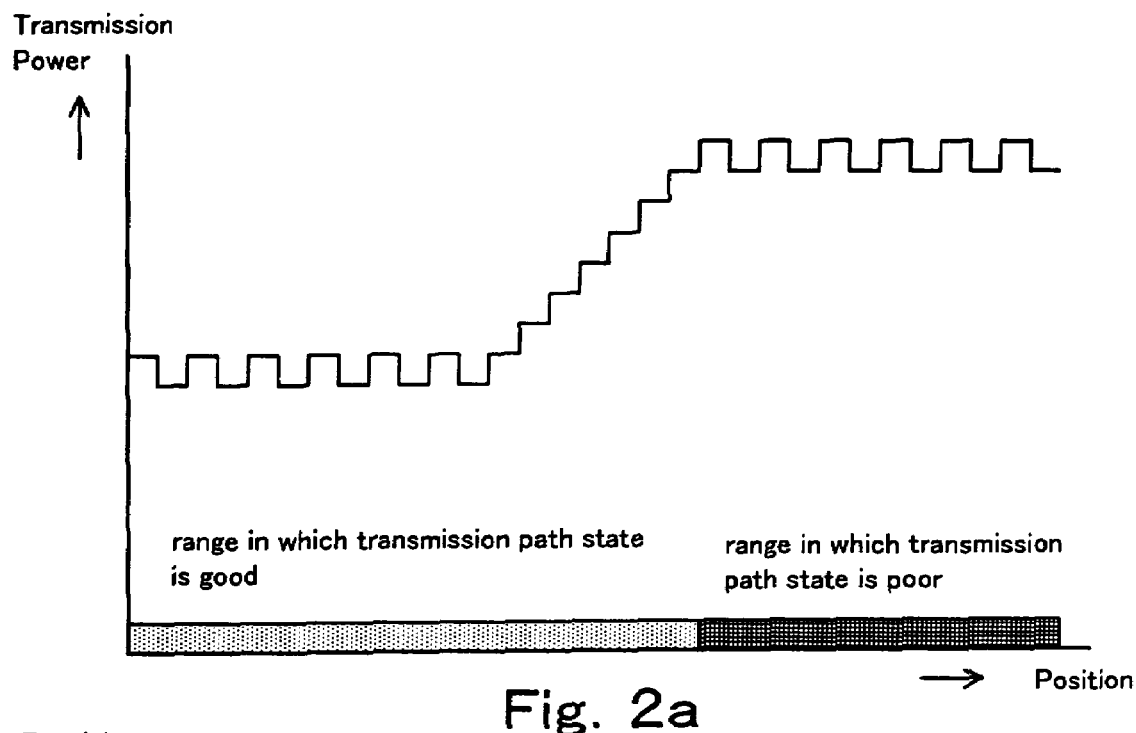
FIG. 2a and FIG. 2b show an example of the operation of the transmission power control method in the mobile communication system depicted in FIG. 1.
Figure 2B:
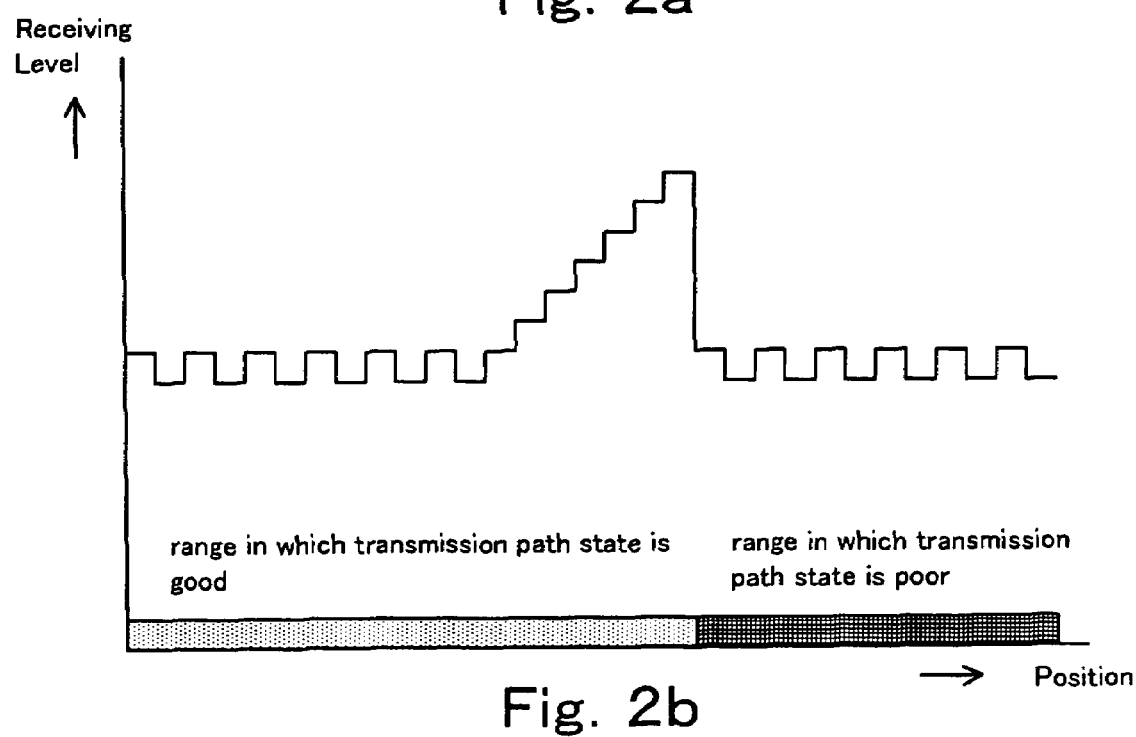

However, suppose that it has been predicted that the state of the downlink transmission path will deteriorate in the manner shown in FIGS. 2a and 2b, where FIG. 2a shows the transmission power of base station BS and FIG. 2b shows the receiving level at mobile station MS, with position being plotted along the horizontal axis. FIGS. 2a and 2b shows the case where, due to the changing position of mobile station MS, the state of the downlink transmission path suddenly changes from good to poor. In such a case, downlink transmission power controller 9 increases the downlink transmission power in advance, before the transmission path state deteriorates, as shown in FIG. 2a. This serves to prevent any decrease in the receiving level at mobile station MS, as shown in FIG. 2b.

Figure 9A:
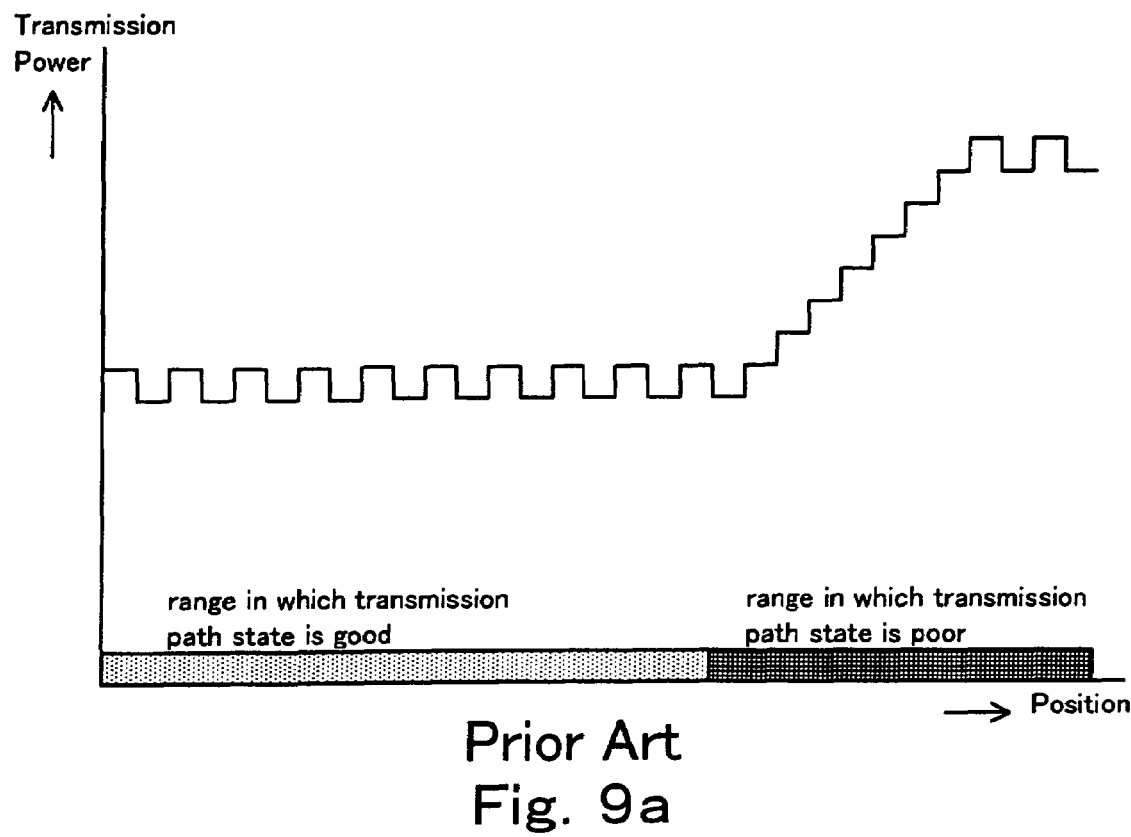
FIG. 9a and FIG. 9b show an example of the operation of a conventional transmission power control method.
Figure 9B:
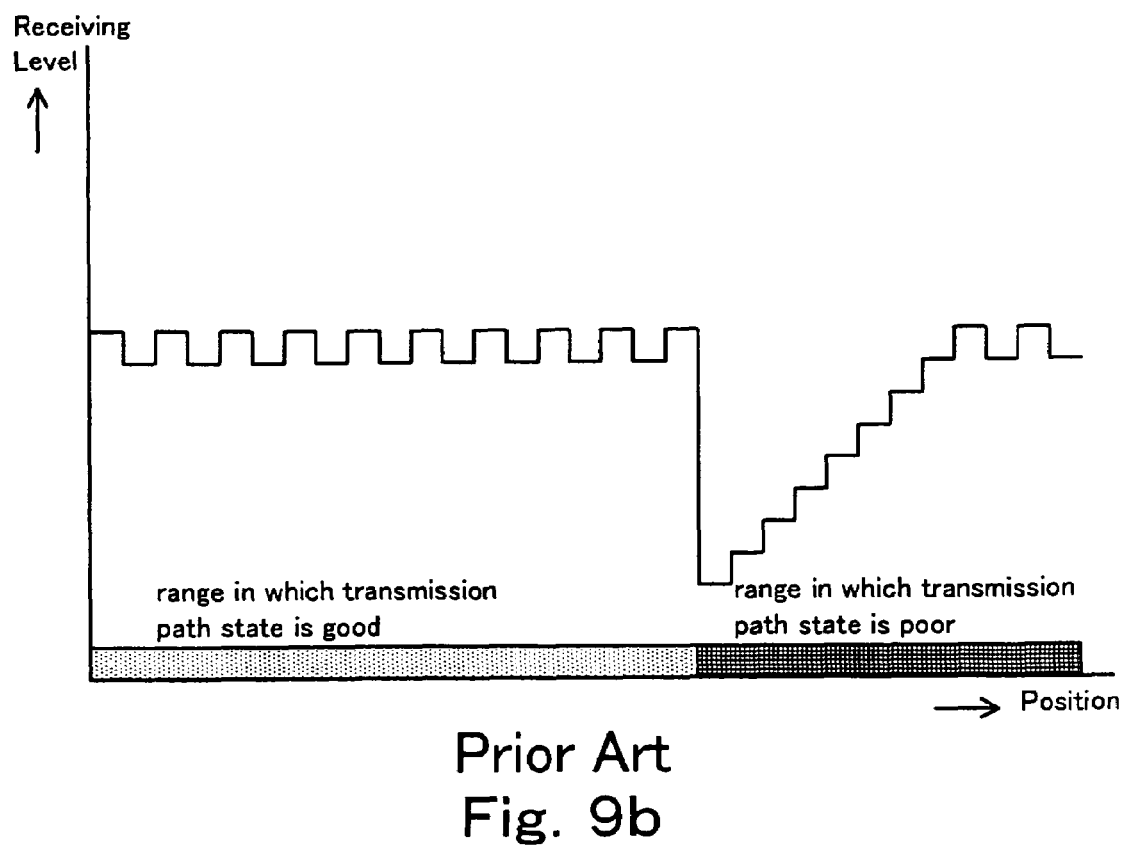

As opposed to this, in the conventional case, as illustrated in FIGS. 9a and 9b, the receiving level at mobile station MS decreases abruptly when there is a sudden deterioration in the state of the downlink transmission path. Hence call quality deteriorates and under some circumstances a call will be dropped. On the other hand, no fall in receiving level of the sort that results from the state of the downlink transmission path causing receiving quality to deteriorate is seen in FIGS. 2a and 2b, which shows the operation of this invention.

Although the example depicted in FIGS. 2a and 2b shows a case where the state of the downlink transmission path suddenly deteriorates, it will be evident that a situation where the state of the downlink transmission path suddenly improves can be handled in the same way.

Figure 3A:
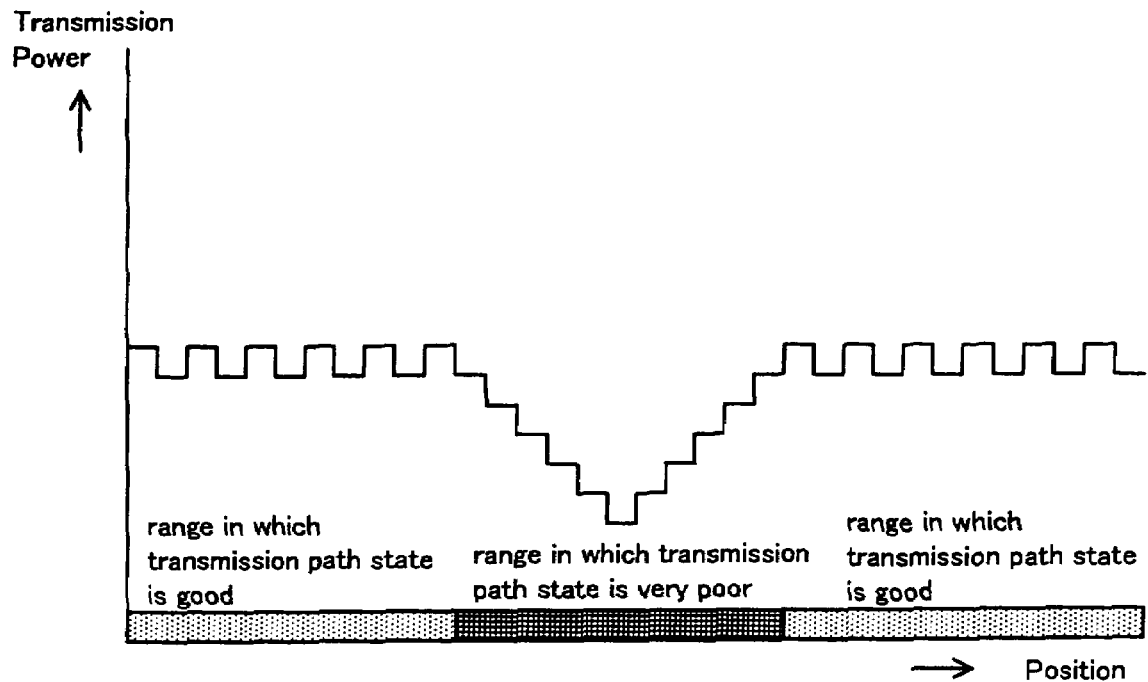
FIG. 3a and FIG. 3b show another example of the operation of the transmission power control method in the mobile communication system depicted in FIG. 1.
Figure 3B:
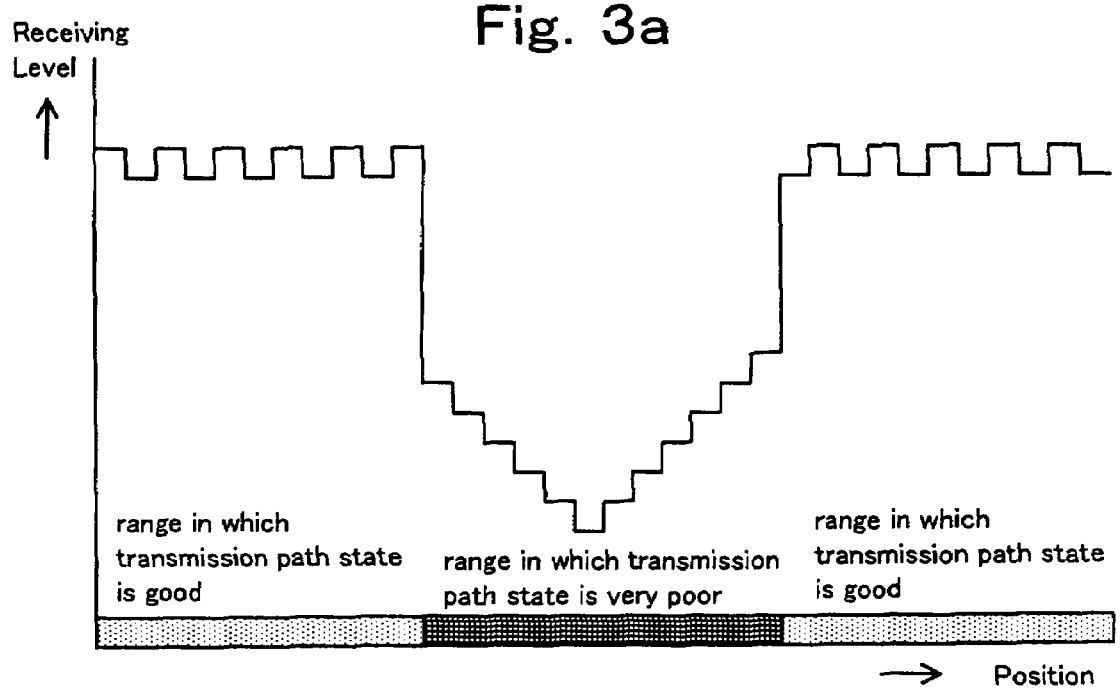

Now suppose that it has been predicted that the state of the downlink transmission path will temporarily become very poor in the manner shown in FIGS. 3a and 3b, where FIG. 3a shows the transmission power of base station BS and FIG. 3b shows the receiving level at mobile station MS, with position being plotted along the horizontal axis. FIGS. 3a and 3b show the case where, due to the changing position of mobile station MS, the state of the downlink transmission path temporarily changes from good to very poor and then returns to good. In such a case, as shown in FIG. 3a, downlink transmission power controller 9 does not cause the transmission power to increase excessively.

As opposed to this, conventionally, if an attempt was made to maintain communication quality, the downlink transmission power ended up being increased to its maximum level. Conventionally, therefore, interference to other users increased, whereas this sort of outcome does not occur in the present embodiment.

A situation where the state of the downlink transmission path temporarily improves can be handled in the same way.

Database 8 records and updates the state of the downlink transmission path as a function of the position of mobile station MS, where the state of the downlink transmission path has been evaluated from the present position of mobile station MS and from the time series of downlink transmission power control commands that have been received.

It is feasible to use a system in which the predicted future state of the downlink transmission path is communicated from mobile station MS to base station BS.

Figure 4:
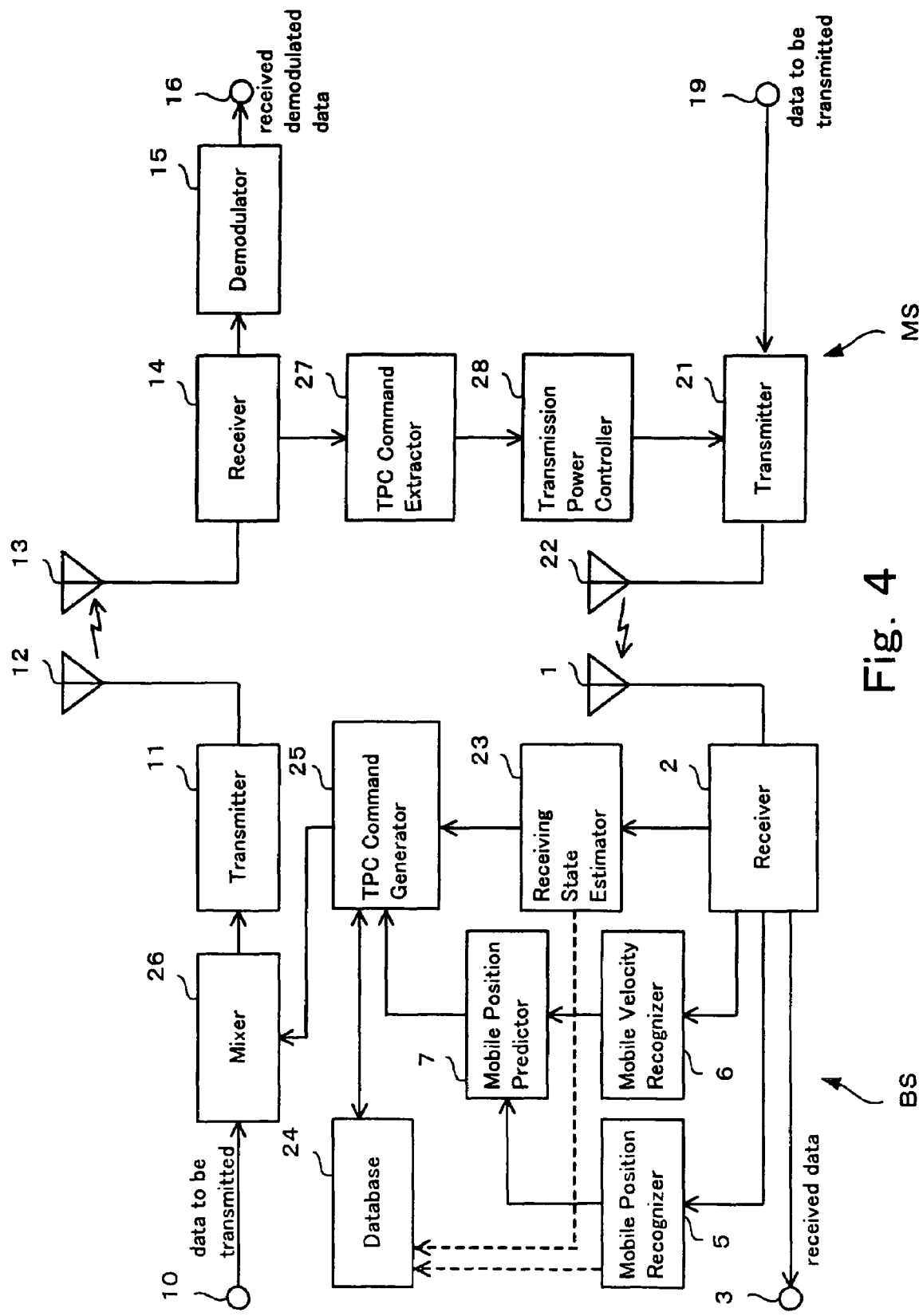
FIG. 4 is a block diagram showing a mobile communication system to which is applied a transmission power control method according to a second embodiment of this invention.

Referring next to FIG. 4, a description will be given of a mobile communication system to which is applied a transmission power control method according to a second embodiment of the invention. It may be pointed out that the transmission power control method of this second embodiment pertains to an uplink transmission power control method. The mobile communication system comprises base station BS and mobile station MS, and in this second embodiment, as in FIG. 8, the left-hand side is base station BS and the right-hand side is mobile station MS.

The mobile communication system illustrated in FIG. 4 has the same configuration as the system shown in FIG. 8, except that the configuration of base station BS has been altered, in the manner to be described below, from the configuration shown in FIG. 8. Accordingly, parts having the same function as parts illustrated in FIG. 8 are given the same referencing numerals, and in order to simplify the description, only those points that differ from the system previously outlined with reference to FIG. 8 will be described below.

Figure 8:
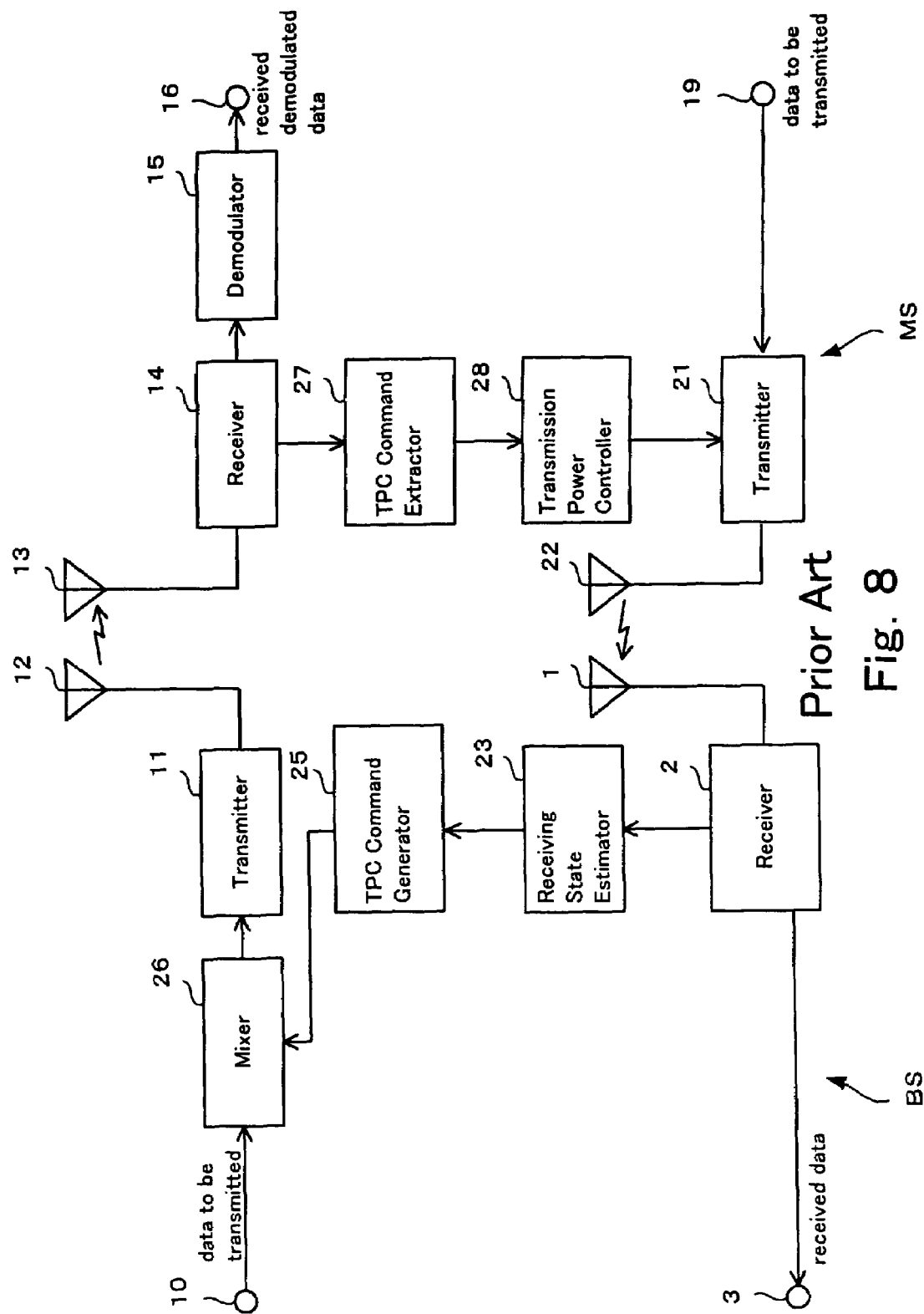
FIG. 8 is a block diagram showing a mobile communication system to which is applied a second conventional transmission power control method.

The mobile communication system illustrated in FIG. 4 differs from the system shown in FIG. 8 in that base station BS additionally comprises: mobile position recognizer 5 and mobile velocity recognizer 6 to which are input the received uplink signal from receiver 2; mobile position predictor 7 for predicting the future position of mobile station MS from its present position as recognized by mobile position recognizer 5 and its present velocity as recognized by mobile velocity recognizer 6; and database 24 in which the state of the uplink transmission path has been recorded as a function of the position of mobile station MS. Mobile position predictor 7 communicates the predicted future position of mobile station MS to uplink transmission power control command generator 25, and uplink transmission power control command generator 25 is adapted to be able to access database 24.

As described above, uplink receiving state estimator 23 uses the received uplink signal from receiver 2 to estimate the uplink receiving state from the received signal level, or from the SIR of the demodulated data, or from the BER of the demodulated data, or from the FER of the demodulated data, or from the estimated state of the transmission path, etc.

Uplink transmission power control command generator 25 acquires, from database 24, the future state of the uplink transmission path at the predicted future position of mobile station MS at elapsed times T, 2T, ..., nT from the present. If there are no changes in these predicted future states of the uplink transmission path, uplink transmission power control command generator 25 compares the estimated uplink receiving state with a reference value and generates an uplink transmission power control command.

Suppose that it has been predicted that the state of the uplink transmission path will deteriorate in the manner shown in FIGS. 2a and 2b, where, in this embodiment, FIG. 2a shows the transmission power of mobile station MS and FIG. 2b shows the receiving level at base station BS, with position being plotted along the horizontal axis. FIGS. 2a and 2b show the case where, due to the changing position of mobile station MS, the state of the uplink transmission path suddenly changes from good to poor. In such a case, uplink transmission power control command generator 25 generates an uplink transmission power control command that serves to increase the uplink transmission power in advance, before the state of the uplink transmission path deteriorates, as shown in FIG. 2a.

A situation where the state of the uplink transmission path suddenly improves is handled in the same way.

Now suppose that it has been predicted that the state of the uplink transmission path will temporarily become very poor in the manner shown in FIGS. 3a and 3b, where, in this embodiment, FIG. 3a shows the transmission power of mobile station MS and FIG. 3b shows the receiving level at base station BS, with position being plotted along the horizontal axis. FIGS. 3a and 3b show the case where, due to the changing position of mobile station MS, the state of the uplink transmission path temporarily changes from good to very poor and then returns to good. In such a case, as shown in FIG. 3a, uplink transmission power control command generator 25 generates an uplink transmission power control command that does not cause the uplink transmission power to increase excessively.

A situation where the state of the uplink transmission path temporarily improves is handled in the same way.

Database 24 records and updates the state of the uplink transmission path as a function of the position of mobile station MS, where the state of the uplink transmission path has been evaluated from the present position of mobile station MS and from the uplink receiving state.

Figure 5:
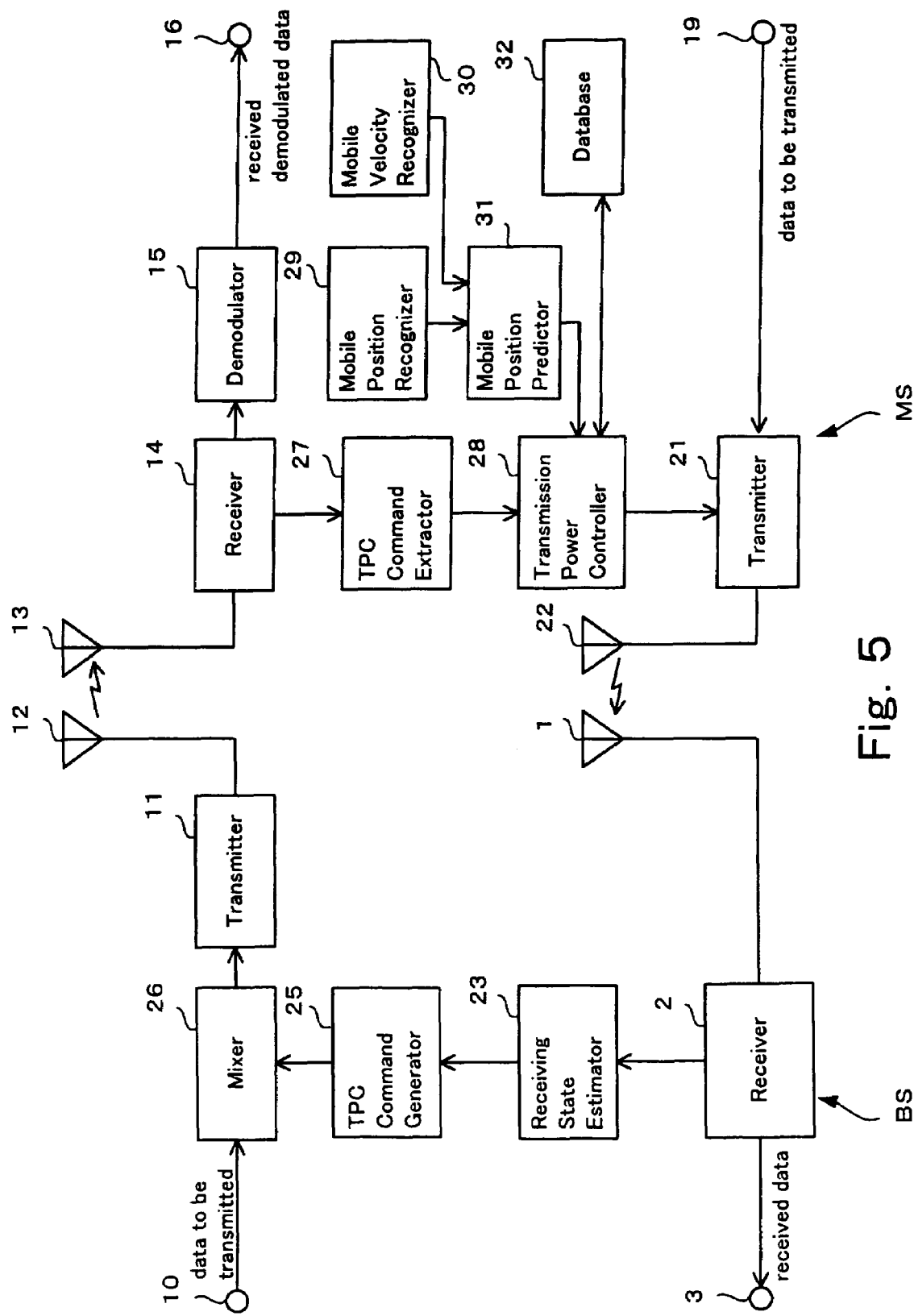
FIG. 5 is a block diagram showing a mobile communication system to which is applied a transmission power control method according to a third embodiment of this invention.

Referring next to FIG. 5, a description will be given of a mobile communication system to which is applied a transmission power control method according to a third embodiment of the invention. It may be pointed out that the transmission power control method of this third embodiment pertains to an uplink transmission power control method. The mobile communication system comprises base station BS and mobile station MS, and in this third embodiment, as in FIG. 8, the left-hand side is base station BS and the right-hand side is mobile station MS.

The mobile communication system illustrated in FIG. 5 has the same configuration as the system shown in FIG. 8, except that the configuration of mobile station MS has been altered, in the manner to be described below, from the configuration shown in FIG. 8. Accordingly, parts having the same function as parts illustrated in FIG. 8 are given the same referencing numerals, and in order to simplify the description, only those points that differ from the system previously outlined with reference to FIG. 8 will be described below.

The mobile communication system illustrated in FIG. 5 differs from the system shown in FIG. 8 in that mobile station MS additionally comprises: mobile position recognizer 29 and mobile velocity recognizer 30; mobile position predictor 31 for predicting the future position of mobile station MS from its present position as recognized by mobile position recognizer 29 and its present velocity as recognized by mobile velocity recognizer 30; and database 32 in which the state of the uplink transmission path has been recorded as a function of the position of mobile station MS. Mobile position predictor 31 communicates the predicted future position of mobile station MS to uplink transmission power controller 28, and uplink transmission power controller 28 is adapted to be able to access database 32.

The operation of mobile station MS shown in FIG. 5 will now be described.

In mobile station MS, receiving antenna 13 receives the downlink radio signal transmitted from transmitting antenna 12 of base station BS and sends it to receiver 14. Receiver 14 despreads this received downlink signal and outputs the despread signal to demodulator 15. Demodulator 15 demodulates the despread signal and outputs the demodulated downlink data from downlink demodulated data output terminal 16. In order to extract the uplink transmission power control command from the received downlink signal, the downlink signal (information) is sent from receiver 14 to uplink transmission power control command extractor 27. The uplink transmission power control command extracted by this uplink transmission power control command extractor 27 is sent to uplink transmission power controller 28. The operation up to this point is the same as the operation of conventional mobile station MS previously described with reference to FIG. 8.

Mobile position recognizer 29 recognizes the present position of mobile station MS. Mobile velocity recognizer 30 recognizes changes in the position of mobile station MS (in other words, it recognizes the present rate of movement of mobile station MS). Mobile station MS can use GPS or other signals to detect its own present position and velocity.

In the following description, T represents the transmission power control interval. Mobile position predictor 31 predicts the future position of mobile station MS at elapsed times T, 2T, ..., nT from the present moment, from previous positions and velocities of mobile station MS.

Uplink transmission power controller 28 acquires, from database 32, the future state of the uplink transmission path at the predicted future position of mobile station MS at elapsed times T, 2T, ..., nT from the present. If there are no changes in these predicted future states of the uplink transmission path, uplink transmission power controller 28 changes the uplink transmission power in accordance with the extracted uplink transmission power control command.

However, suppose that it has been predicted that the state of the uplink transmission path will deteriorate in the manner shown in FIGS. 2a and 2b, where, in this embodiment, FIG. 2a shows the transmission power of mobile station MS and FIG. 2b shows the receiving level at base station BS, with position being plotted along the horizontal axis. FIGS. 2a and 2b show the case where, due to the changing position of mobile station MS, the state of the uplink transmission path suddenly changes from good to poor. In such a case, uplink transmission power controller 28 increases the uplink transmission power in advance, before the state of the uplink transmission path deteriorates, as shown in FIG. 2a. This serves to prevent any decrease in the receiving level at base station BS, as shown in FIG. 2b.

As opposed to this, in the conventional case, as illustrated in FIGS. 9a and 9b, the receiving level at base station BS decreases abruptly when there is a sudden deterioration in the state of the uplink transmission path. Hence call quality deteriorates and under some circumstances a call will be dropped. On the other hand, no fall in receiving level of the sort that results from the state of the uplink transmission path causing receiving quality to deteriorate is seen in FIGS. 2a and 2b, which shows the operation of this invention.

Although the example depicted in FIGS. 2a and 2b shows a case where the state of the uplink transmission path suddenly deteriorates, it will be evident that a situation where the state of the uplink transmission path suddenly improves can be handled in the same way.

Now suppose that it has been predicted that the state of the uplink transmission path will temporarily become very poor in the manner shown in FIGS. 3a and 3b, where, in this embodiment, FIG. 3a shows the transmission power of mobile station MS and FIG. 3b shows the receiving level at base station BS, with position being plotted along the horizontal axis. FIGS. 3a and 3b show the case where, due to the changing position of mobile station MS, the state of the uplink transmission path temporarily changes from good to very poor and then returns to good. In such a case, as shown in FIG. 3a, uplink transmission power controller 28 does not cause the uplink transmission power to increase excessively.

As opposed to this, conventionally, if an attempt was made to maintain communication quality, the uplink transmission power ended up being increased to its maximum level. Conventionally, therefore, interference to other users increased, whereas this sort of outcome does not occur in the present embodiment.

A situation where the state of the uplink transmission path temporarily improves can be handled in the same way.

Database 32 records and updates the state of the uplink transmission path as a function of the position of mobile station MS, where the state of the uplink transmission path has been evaluated from the present position of mobile station MS and from the time series of uplink transmission power control commands that have been received.

It is feasible to use a system in which the predicted future state of the uplink transmission path is communicated from base station BS to mobile station MS.

Figure 6:
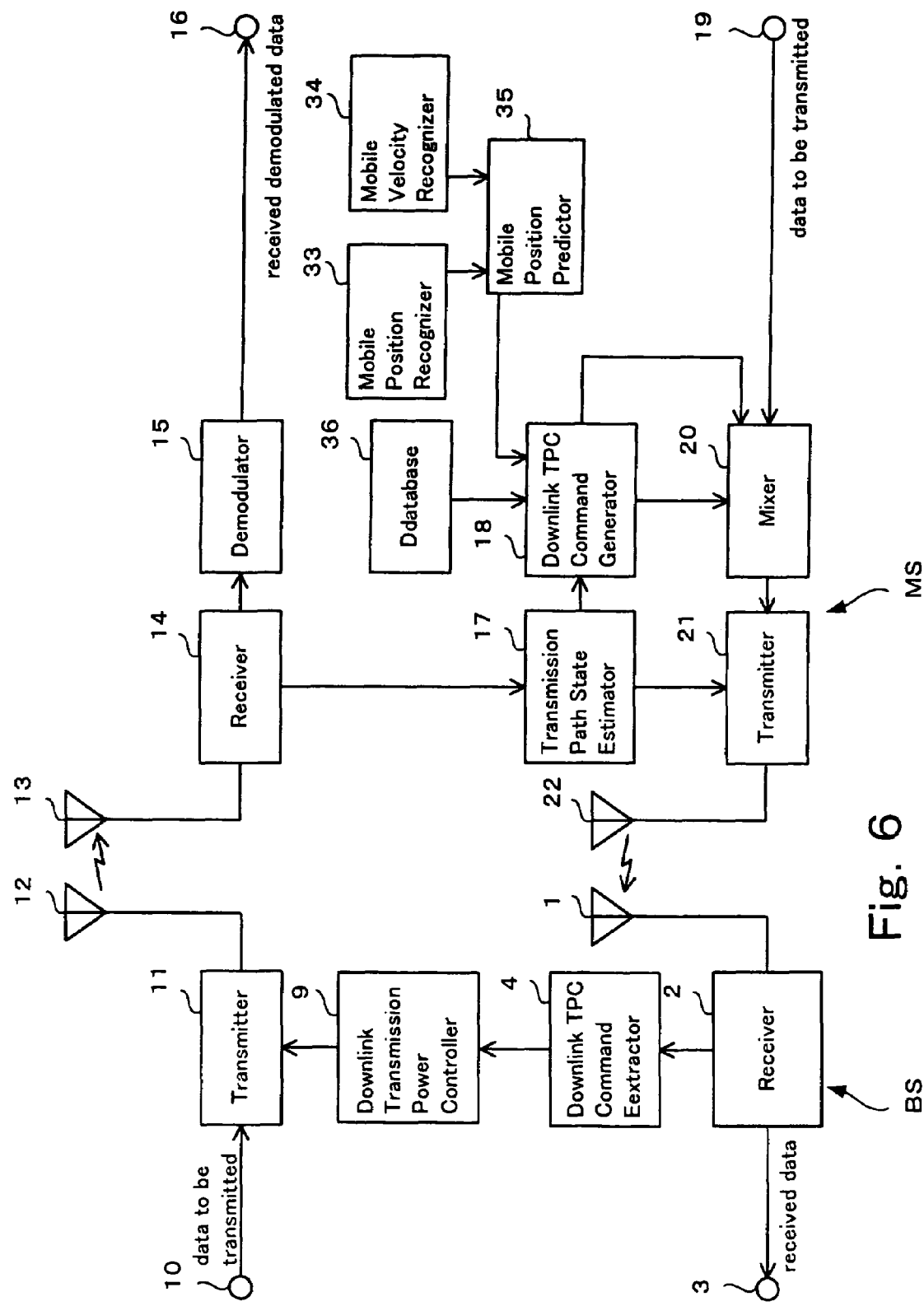
FIG. 6 is a block diagram showing a mobile communication system to which is applied a transmission power control method according to a fourth embodiment of this invention.

Referring next to FIG. 6, a description will be given of a mobile communication system to which is applied a transmission power control method according to a fourth embodiment of the invention. It may be pointed out that the transmission power control method of this fourth embodiment pertains to a downlink transmission power control method. The mobile communication system comprises base station BS and mobile station MS, and in this fourth embodiment, as in FIG. 7, the left-hand side is base station BS and the right-hand side is mobile station MS.

The mobile communication system illustrated in FIG. 6 has the same configuration as the system shown in FIG. 7, except that the configuration of mobile station MS has been altered, in the manner to be described below, from the configuration shown in FIG. 7. Accordingly, parts having the same function as parts illustrated in FIG. 7 are given the same referencing numerals, and in order to simplify the description, only those points that differ from the system previously outlined with reference to FIG. 7 will be described below.

The mobile communication system illustrated in FIG. 6 differs from the system shown in FIG. 7 in that mobile station MS additionally comprises: mobile position recognizer 33 and mobile velocity recognizer 34; mobile position predictor 35 for predicting the future position of mobile station MS from its present position as recognized by mobile position recognizer 33 and its present velocity as recognized by mobile velocity recognizer 34; and database 36 in which the state of the downlink transmission path has been recorded as a function of the position of mobile station MS. Mobile position predictor 35 communicates the predicted future position of mobile station MS to downlink transmission power control command generator 18, and downlink transmission power control command generator 18 is adapted to be able to access database 36.

The operation of mobile station MS shown in FIG. 6 will now be described.

In mobile station MS, receiving antenna 13 receives downlink radio signals transmitted from transmitting antenna 12 of base station BS and sends them to receiver 14. Receiver 14 despreads this received downlink signal and outputs the despread signal to demodulator 15. Demodulator 15 demodulates the despread signal and outputs the demodulated downlink data from downlink demodulated data output terminal 16.

Independently of this, the downlink signal from receiver 14 to supplied to downlink transmission path state estimator 17. Downlink transmission path state estimator 17 estimates the state of the downlink transmission path from the received signal obtained from receiver 14. Downlink transmission path state estimator 17 sends, to downlink transmission power control command generator 18, an estimated transmission path signal indicative of the estimated state of the downlink transmission path. The operation up to this point is the same as the operation of conventional mobile station MS previously described with reference to FIG. 7.

Mobile position recognizer 33 recognizes the present position of mobile station MS. Mobile velocity recognizer 34 recognizes changes in the position of mobile station MS (in other words, it recognizes the present rate of movement of mobile station MS). Mobile station MS can use GPS or other signals to detect its own present position and velocity.

In the following description, T represents the transmission power control interval. Mobile position predictor 35 predicts the future position of mobile station MS at elapsed times T, 2T, ..., nT from the present moment, from previous positions and velocities of mobile station MS.

Downlink transmission power control command generator 18 acquires, from database 36, the future state of the downlink transmission path at the predicted future position of mobile station MS at elapsed times T, 2T, ..., nT from the present. If there are no changes in these predicted future states of the downlink transmission path, downlink transmission power control command generator 18 compares the calculated SINR with the target SINR and generates a downlink transmission power control command.

Suppose that it has been predicted that the state of the downlink transmission path will deteriorate in the manner shown in FIGS. 2a and 2b, where, in this embodiment, FIG. 2a shows the transmission power of base station BS and FIG. 2b shows the receiving level at mobile station MS, with position being plotted along the horizontal axis. FIGS. 2a and 2b show the case where, due to the changing position of mobile station MS, the state of the downlink transmission path suddenly changes from good to poor. In such a case, downlink transmission power control command generator 18 generates a downlink transmission power control command that serves to increase the downlink transmission power in advance, before the state of the downlink transmission path deteriorates, as shown in FIG. 2a.

A situation where the state of the downlink transmission path suddenly improves is handled in the same way.

Now suppose that it has been predicted that the state of the downlink transmission path will temporarily become very poor in the manner shown in FIGS. 3a and 3b, where, in this embodiment, FIG. 3a shows the transmission power of base station BS and FIG. 3b shows the receiving level at mobile station MS, with position being plotted along the horizontal axis. FIGS. 3a and 3b show the case where, due to the changing position of mobile station MS, the state of the downlink transmission path temporarily changes from good to very poor and then returns to good. In such a case, as shown in FIG. 3a, downlink transmission power control command generator 18 generates a downlink transmission power control command that does not cause the downlink transmission power to increase excessively.

A situation where the state of the downlink transmission path temporarily improves is handled in the same way.

Database 36 records and updates the state of the downlink transmission path as a function of the position of mobile station MS, where the state of the downlink transmission path has been evaluated from the present position of mobile station MS and from the downlink receiving state.

Although the present invention has been described by way of preferred exemplary embodiments, it is of course not restricted to these embodiments. For example, in the foregoing embodiments, there was a database in each base station or in each mobile station, and the information in these databases was updated on an individual basis, but it would also be feasible for the information in each database to be shared among the base stations or with the other mobile stations. Moreover, by sharing database information among the base stations, it would be possible to designate in advance which base station was to be in charge of handover, and for the choice of base station to be dependent on base station load. This would serve to prevent unnecessary handover.

Moreover, in the embodiments described above, the future position of a mobile station was predicted from its present position and present rate of movement, but it would also be feasible to predict the future position by means of another method. Again, the future state of a transmission path was obtained from the future position of a mobile station, but it would also be feasible to obtain it by means of some other method.

It will be evident from the foregoing descriptions that because the present invention predicts the future state of a transmission path and controls transmission power in accordance with this predicted future state, it is capable of suppressing the deterioration in communication quality that has conventionally occurred during sudden changes in the state of a transmission path, and achieves this by enabling transmission power control to be carried out smoothly even at such times.

What is claimed is:

1. A method for controlling downlink transmission power of a base station in a mobile communication system wherein downlink radio signals are transmitted from the base station to a mobile station via a downlink, comprising:
   receiving the downlink radio signals and uplink radio signals via, respectively, the downlink or an uplink;
   estimating a present state of a downlink transmission path from the received downlink radio signals;
   recognizing a present position of the mobile station from one of the received downlink or uplink radio signals;
   recognizing a present rate of movement of the mobile station from one of the received downlink or uplink radio signals;
   predicting a future position of the mobile station based on the recognized present position and present rate of movement of the mobile station;
   obtaining a future state of a downlink transmission path based on the predicted future position; and
   controlling the downlink transmission power of the base station based at least on the predicted future downlink transmission path state and the estimated present state of the downlink transmission path.

2. A method for controlling downlink transmission power of a base station in a mobile communication system wherein downlink radio signals are transmitted from the base station to a mobile station via a downlink, comprising:
   predicting a future position of the mobile station;
   obtaining a future state of a downlink transmission path corresponding to the predicted future position of the mobile station by looking up a database which stores a state of the downlink transmission path as a function of a mobile station position; and
   controlling the downlink transmission power of the base station on the basis of the future state of the downlink transmission path that has been obtained.

3. A method for controlling the downlink transmission power of a base station in a mobile communication system wherein downlink radio signals are transmitted from this base station to a mobile station via a downlink:
   which is characterized by:
   recognizing the present position of the mobile station;
   recognizing the present rate of movement of the mobile station;
   predicting the future position of the mobile station from its present position and present rate of movement;
   obtaining the future state of the downlink transmission path corresponding to this predicted future position of the mobile station; and
   controlling the downlink transmission power of the base station on the basis of this future state of the downlink transmission path that has been obtained.

4. A base station which controls downlink transmission power in a mobile communication system wherein downlink radio signals are transmitted from the base station to a mobile station via a downlink, comprising:
   means for receiving the downlink radio signals via the downlink;
   means for receiving uplink radio signals via an uplink;
   means for estimating a present state of a downlink transmission path from the received downlink radio signals;
   one of means for recognizing a present position of the mobile station from the received downlink radio signals or means for recognizing a present position of the mobile station from the received uplink radio signals;

one of means for recognizing a present rate of movement of the mobile station from the received downlink radio signals or means for recognizing a present rate of movement of the mobile station from the received uplink radio signals;

means for predicting a future position of the mobile station based on the recognized present position and present rate of movement of the mobile station;

means for obtaining a future state of the downlink transmission path based on the predicted future position; and means for controlling the downlink transmission power based at least on the predicted future downlink transmission path state and the estimated present state of the downlink transmission path.

5. A base station which controls downlink transmission power in a mobile communication system wherein downlink radio signals are transmitted from the base station to a mobile station via a downlink, comprising:

means for predicting a future position of the mobile station;

means for obtaining a future state of a downlink transmission path corresponding to the predicted future position of the mobile station by looking up a database which stores a state of the downlink transmission path as a function of a mobile station position; and means for controlling the downlink transmission power of the base station on the basis of the future state of the downlink transmission path that has been obtained.

6. A base station which controls its downlink transmission power in a mobile communication system wherein downlink radio signals are transmitted from this base station to a mobile station via a downlink:

which is characterized by comprising:

means for recognizing the present position of the mobile station;

means for recognizing the present rate of movement of the mobile station;

means for predicting the future position of the mobile station from its present position and present rate of movement;

means for obtaining the future state of the downlink transmission path corresponding to this predicted future position of the mobile station; and means for controlling the downlink transmission power of the base station on the basis of the future state of the downlink transmission path that has been obtained.

7. A base station which uses downlink transmission power control commands transmitted from a mobile station via an uplink to control its downlink transmission power in such manner that the downlink receiving state at this mobile station becomes good:

which is characterized by comprising:

a receiver for receiving uplink radio signals that have been transmitted via the uplink;

a downlink transmission power control command extractor for extracting the aforementioned downlink transmission power control commands from the received uplink signal;

a mobile position recognizer for recognizing the present position of the mobile station from the received uplink signal;

a mobile velocity recognizer for recognizing the present rate of movement of the mobile station from the received uplink signal;

a mobile position predictor for predicting the future position of the mobile station from its present position and present rate of movement;

a database in which the state of the downlink transmission path has been recorded as a function of mobile position;

a downlink transmission power controller for looking up the database on the basis of the predicted future position of the mobile station, and for controlling the downlink transmission power of the base station on the basis of (i) the future state of the downlink transmission path obtained as a result of the lookup, and (ii) the aforementioned downlink transmission power control command; and a transmitter for transmitting at the downlink transmission power instructed by the downlink transmission power controller.

8. The base station claimed in claim 7 wherein the database records the state of the downlink transmission path as a function of the position of the mobile station, where the state of the downlink transmission path has been evaluated from the time series of downlink transmission power control commands that have been received.

9. The base station claimed in claim 7, wherein the state of the downlink transmission path is communicated from the mobile station to the base station, and the database records this communicated state of the downlink transmission path as a function of the position of the mobile station.

10. The base station claimed in claim 7, wherein when it is predicted that the state of the downlink transmission path will deteriorate, the downlink transmission power controller increases the downlink transmission power in advance within a range that does not exceed the maximum transmission power.

11. The base station claimed in claim 7, wherein when it is predicted that the state of the downlink transmission path will become very poor, the downlink transmission power controller does not increase the downlink transmission power.

12. The base station claimed in claim 7, wherein the database controls transmission power during diversity handover by sharing information with a plurality of base stations.

13. A mobile station which uses downlink transmission power control commands transmitted from the mobile station via the uplink to control the downlink transmission power of a base station so that the downlink receiving state at the mobile station becomes good:

which is characterized by comprising:

a receiver for receiving downlink radio signals that have been transmitted via the downlink;

a downlink transmission path state estimator for estimating the present state of the downlink transmission path from the received downlink signal;

a mobile position recognizer for recognizing the present position of the mobile station;

a mobile velocity recognizer for recognizing the present rate of movement of the mobile station;

a mobile position predictor for predicting the future position of the mobile station from its present position and present rate of movement;

a database in which the state of the downlink transmission path has been recorded as a function of mobile position;

a downlink transmission power control command generator for looking up the database on the basis of the predicted future position of the mobile station, and for generating downlink transmission power control commands for controlling the downlink transmission power of the base station on the basis of (i) the future state of the downlink transmission path obtained as a result of the lookup, and (ii) the aforementioned estimated present state of the transmission path;

a mixer for outputting the mixed signal obtained by mixing the uplink data with the aforementioned generated downlink transmission power control command; and a transmitter for transmitting the mixed signal.

14. The mobile station claimed in claim 13, wherein, when it is predicted that the state of the downlink transmission path will deteriorate, the downlink transmission power control command generator generates a downlink transmission power control command that increases the downlink transmission power in advance.

15. The mobile station claimed in claim 13, wherein, when it is predicted that the state of the downlink transmission path will become very poor, the downlink transmission power control command generator generates a downlink transmission power control command that does not increase the downlink transmission power.

* * * * *